(12) United States Patent
Mikkelsen et al.

(10) Patent No.: US 11,630,000 B2
(45) Date of Patent: Apr. 18, 2023

(54) HIGH SPEED AND SPECTRALLY SELECTIVE PYROELECTRIC DETECTORS WITH PLASMONIC STRUCTURES AND METHODS OF MAKING AND USING SAME

(71) Applicant: Duke University, Durham, NC (US)

(72) Inventors: Maiken Mikkelsen, Durham, NC (US); Jon Stewart, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 16/894,692

(22) Filed: Jun. 5, 2020

(65) Prior Publication Data

US 2021/0164840 A1    Jun. 3, 2021

Related U.S. Application Data

(60) Provisional application No. 62/857,329, filed on Jun. 5, 2019.

(51) Int. Cl.
    *G01J 5/34* (2022.01)
(52) U.S. Cl.
    CPC ..................... *G01J 5/34* (2013.01)

(58) Field of Classification Search
    None
    See application file for complete search history.

(56) References Cited

U.S. PATENT DOCUMENTS

| | | | |
|---|---|---|---|
| 2015/0035110 A1* | 2/2015 | Pisano | G01J 5/0853 |
| | | | 257/443 |
| 2016/0305824 A1* | 10/2016 | Ozyilmaz | G01J 5/34 |
| 2019/0307370 A1* | 10/2019 | Shinohara | A61B 5/683 |

* cited by examiner

*Primary Examiner* — Edwin C Gunberg
(74) *Attorney, Agent, or Firm* — Olive Law Group, PLLC

(57) ABSTRACT

High speed and spectrally selective pyroelectric detectors with plasmonic structure and methods of making and using same are disclosed. According to an aspect, a pyroelectric detector includes an artificial optical absorber or plasmonic absorber comprising an ensemble of subwavelength conductive components forming a plasmonic structure configured to receive light and to generate thermal energy from the received light. Further, the pyroelectric detector includes a pyroelectric material configured to receive the generated thermal energy from the plasmonic structure and to generate an electrical signal representative of the received thermal energy. Further, the pyroelectric detector includes an electronic component configured to receive the electrical signal from the pyroelectric material for detection of the received light.

20 Claims, 17 Drawing Sheets

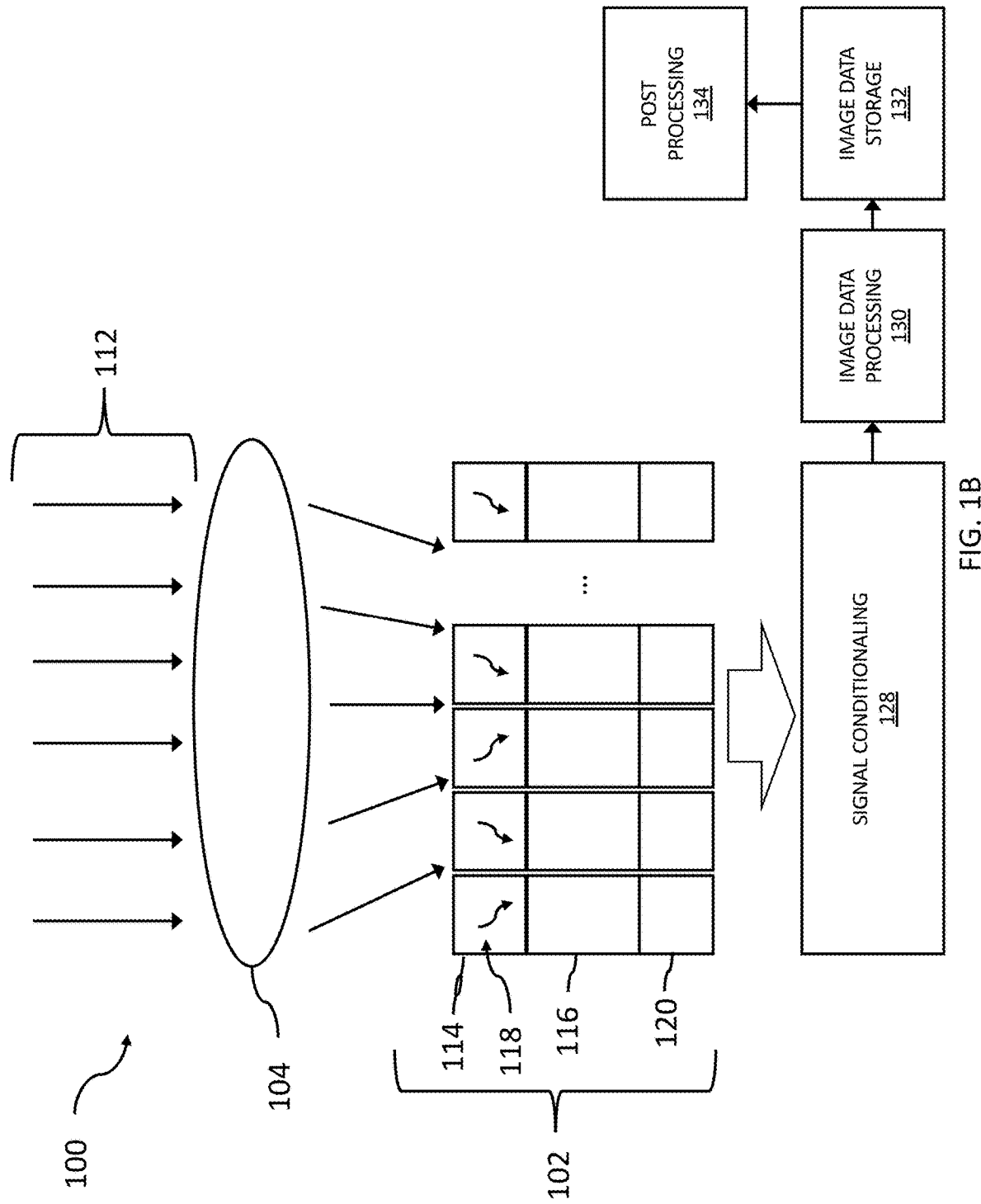

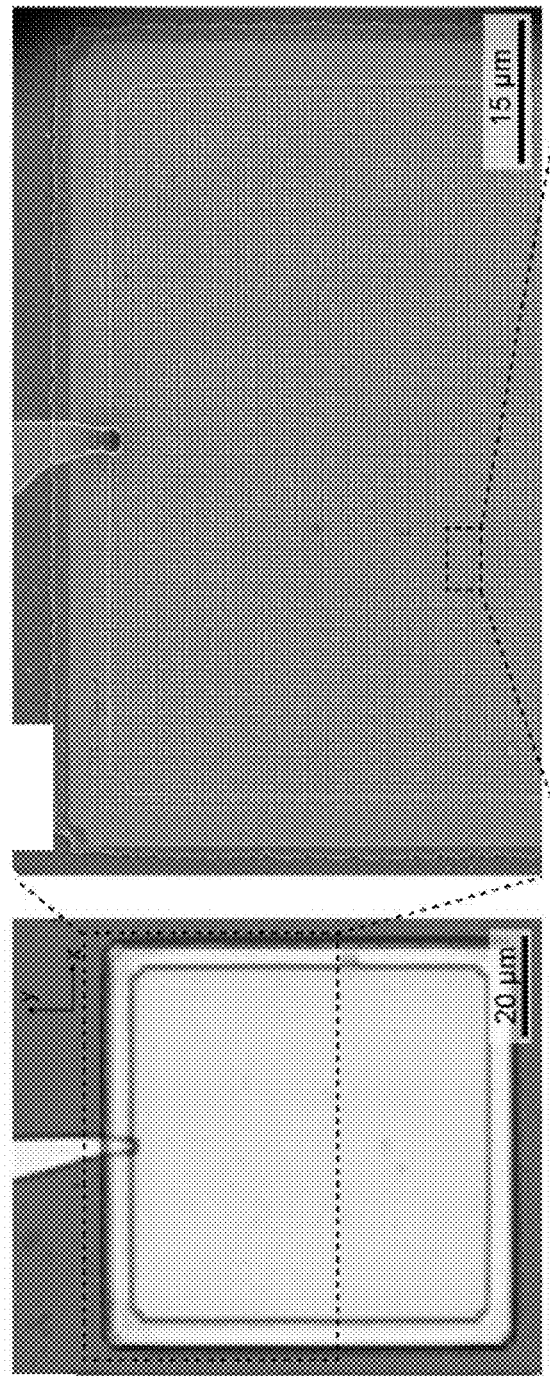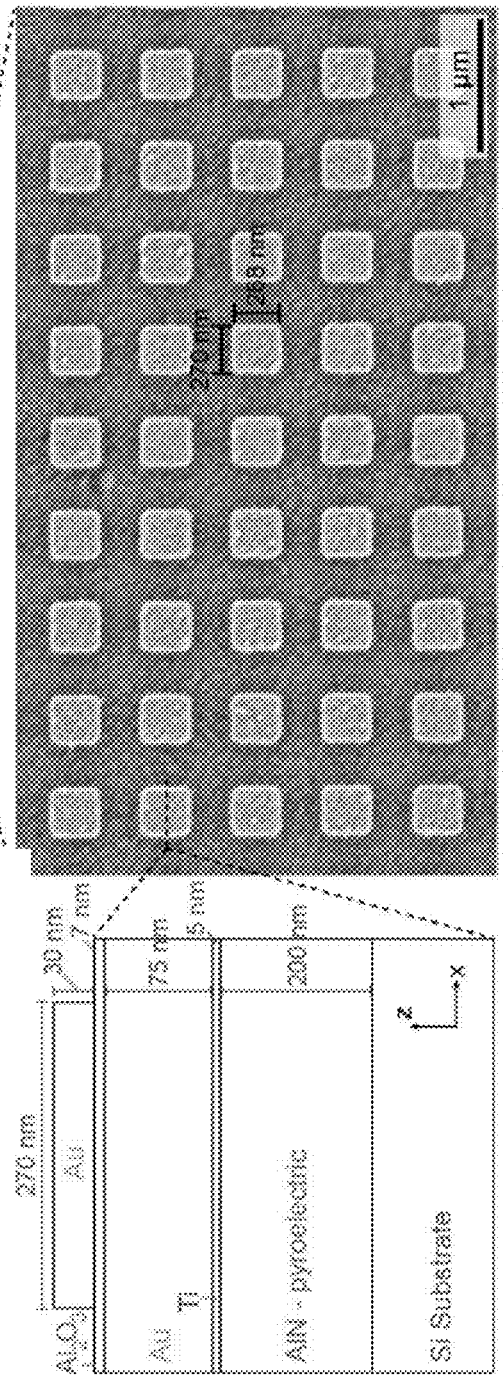
FIG. 9A  FIG. 9B  FIG. 9C  FIG. 9D

HIGH SPEED AND SPECTRALLY SELECTIVE PYROELECTRIC DETECTORS WITH PLASMONIC STRUCTURES AND METHODS OF MAKING AND USING SAME

CROSS REFERENCE TO RELATED APPLICATION

This application claims priority to U.S. Patent Application No. 62/857,329, filed Jun. 5, 2019, and titled DEVICES AND SYSTEMS FOR HIGH-SPEED PYROELECTRIC PHOTODETECTION AND METHODS OF MAKING AND USING SAME, the content of which is incorporated herein by reference in its entirety.

TECHNICAL FIELD

The presently disclosed subject matter relates generally to light detectors. Particularly, the presently disclosed subject matter relates to high speed and spectrally selective pyroelectric detectors with plasmonic structures and methods of making and using same.

BACKGROUND

Pyroelectric devices or sensors are capable of detecting thermal energy. Particularly, a pyroelectric device includes a particular type of crystal or polycrystalline material which is naturally electrically polarized and generates a temporary current when heated or cooled. The change in temperature modifies the polarization of the crystal structure which causes electrical charges to flow to electrostatically screen the polarization change across the crystal. Pyroelectric devices have been used as heat sensors, light detectors, and power generators. Pyroelectric materials are materials that possess a temperature dependent spontaneous polarization.

A primary issue with commercial and state-of-the-art pyroelectric detectors is their millisecond to microsecond response times, as compared to the picosecond scale response times of readily utilized photodiodes and photoconductors. Arrays of pyroelectric detectors compound this issue as the array readout time can be proportional to the array size and the individual detector response time, and so simultaneously achieving high-resolutions (large array sizes) and fast frame rates can be challenging. Despite this, pyroelectric arrays are commonly utilized for beam profiling and uncooled imaging arrays in the mid- and far-infrared regions due to their ease of fabrication and broader wavelength range. For instance, commercial pyroelectric beam profilers for the infrared regime possess real-time frame rates (30-60 frames per second) for about 300×300 arrays, however, commercial CCD beam profilers in the visible spectrum can possess real-time readouts for megapixel arrays. Faster pyroelectric detectors can allow for these infrared arrays to directly compete with the temporal resolution at the visible and near-infrared wavelengths. Therefore, for at least these reasons, there is a desire to provide pyroelectric detectors with faster response times and other improved characteristics.

BRIEF DESCRIPTION OF THE DRAWINGS

Figure 1A:
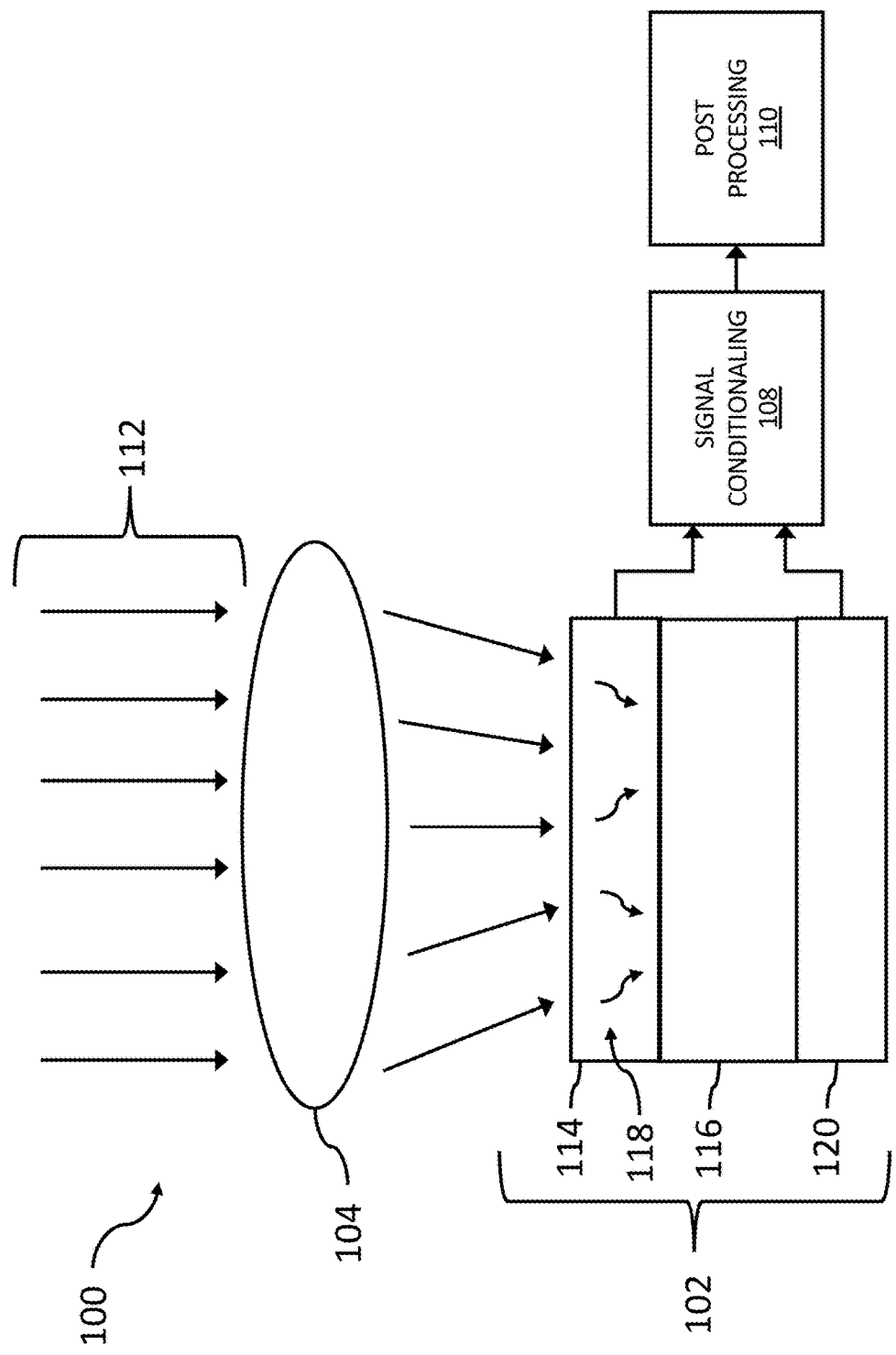
Figure 2A:
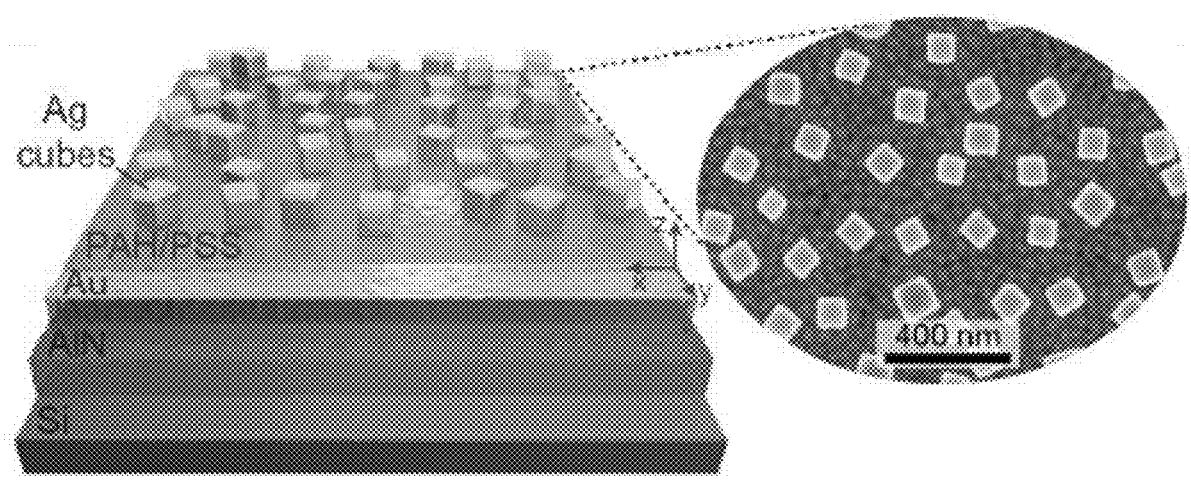
Figure 2B:
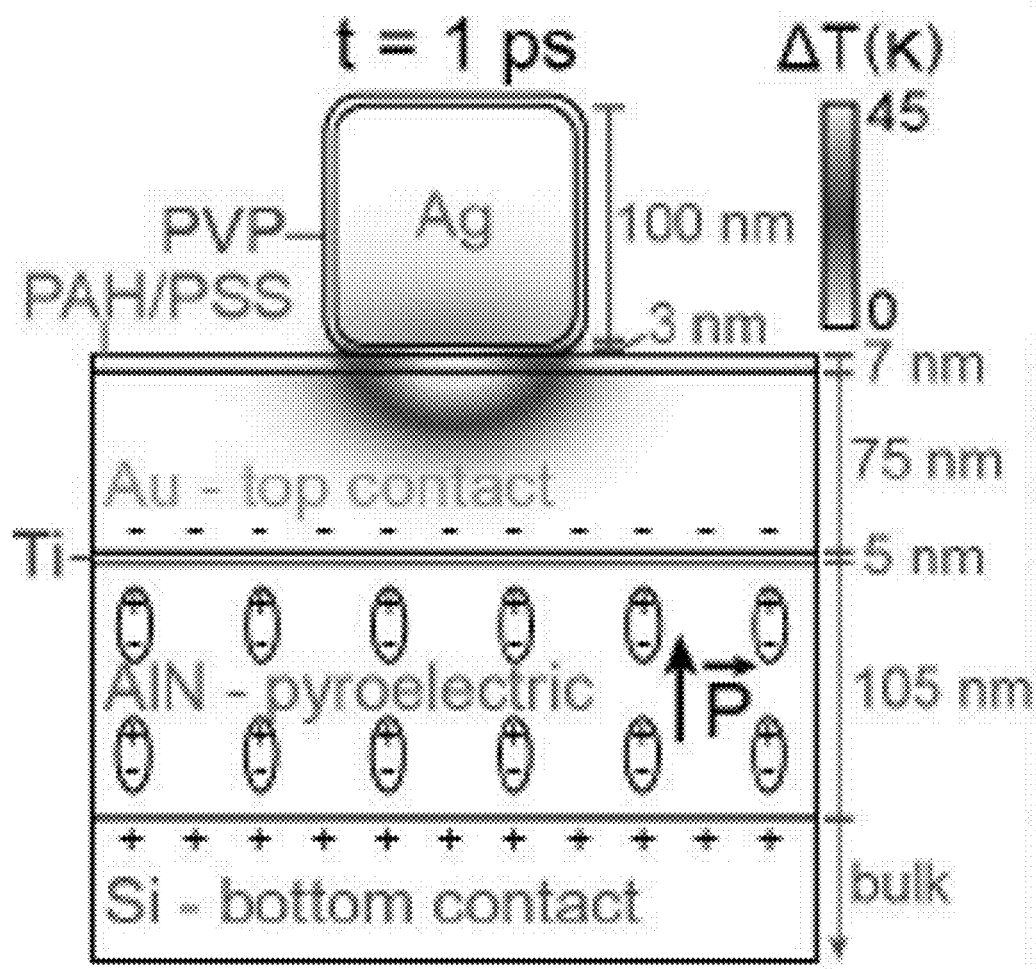
Figure 2C:
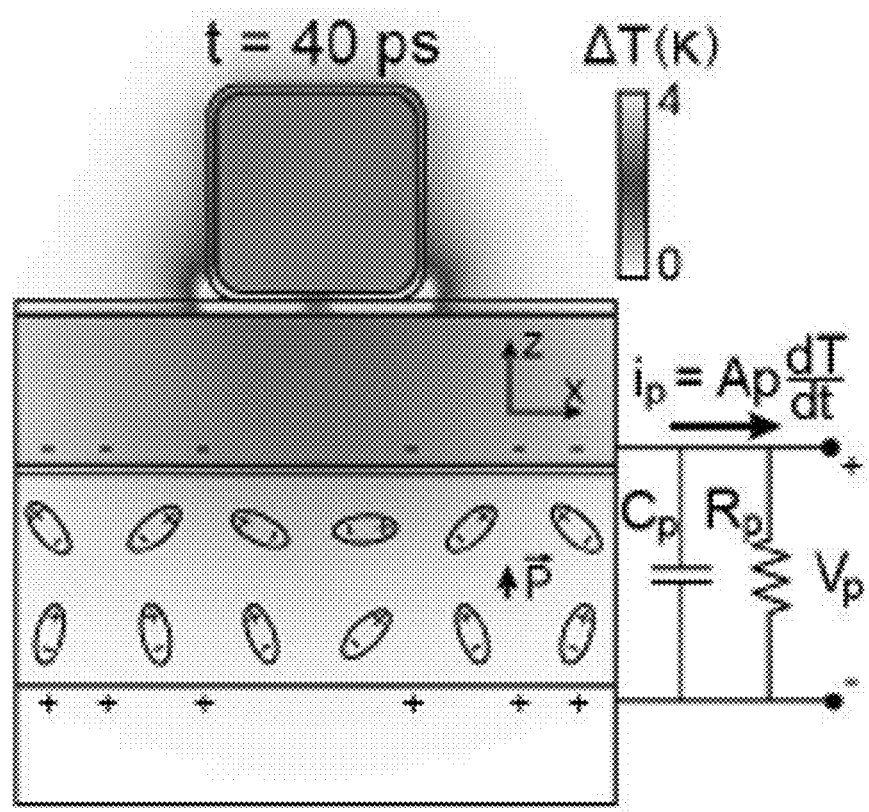
Figure 2D:
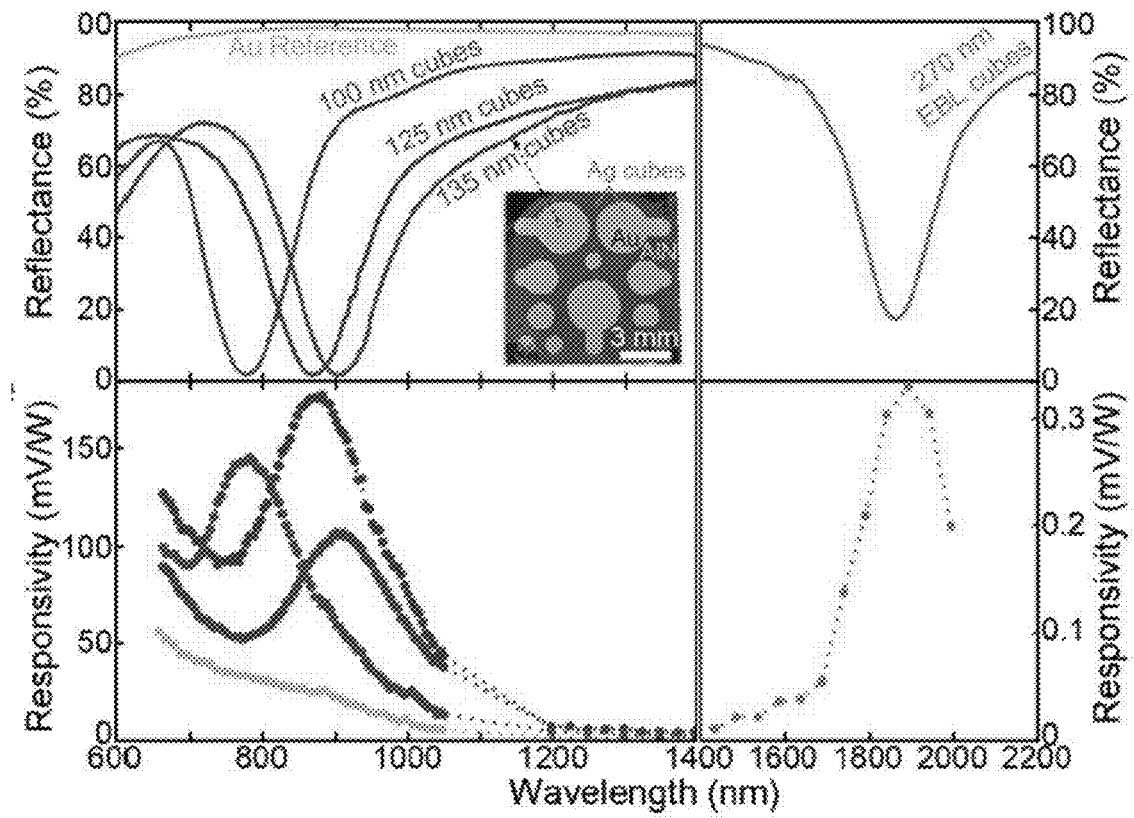
Figure 3A:
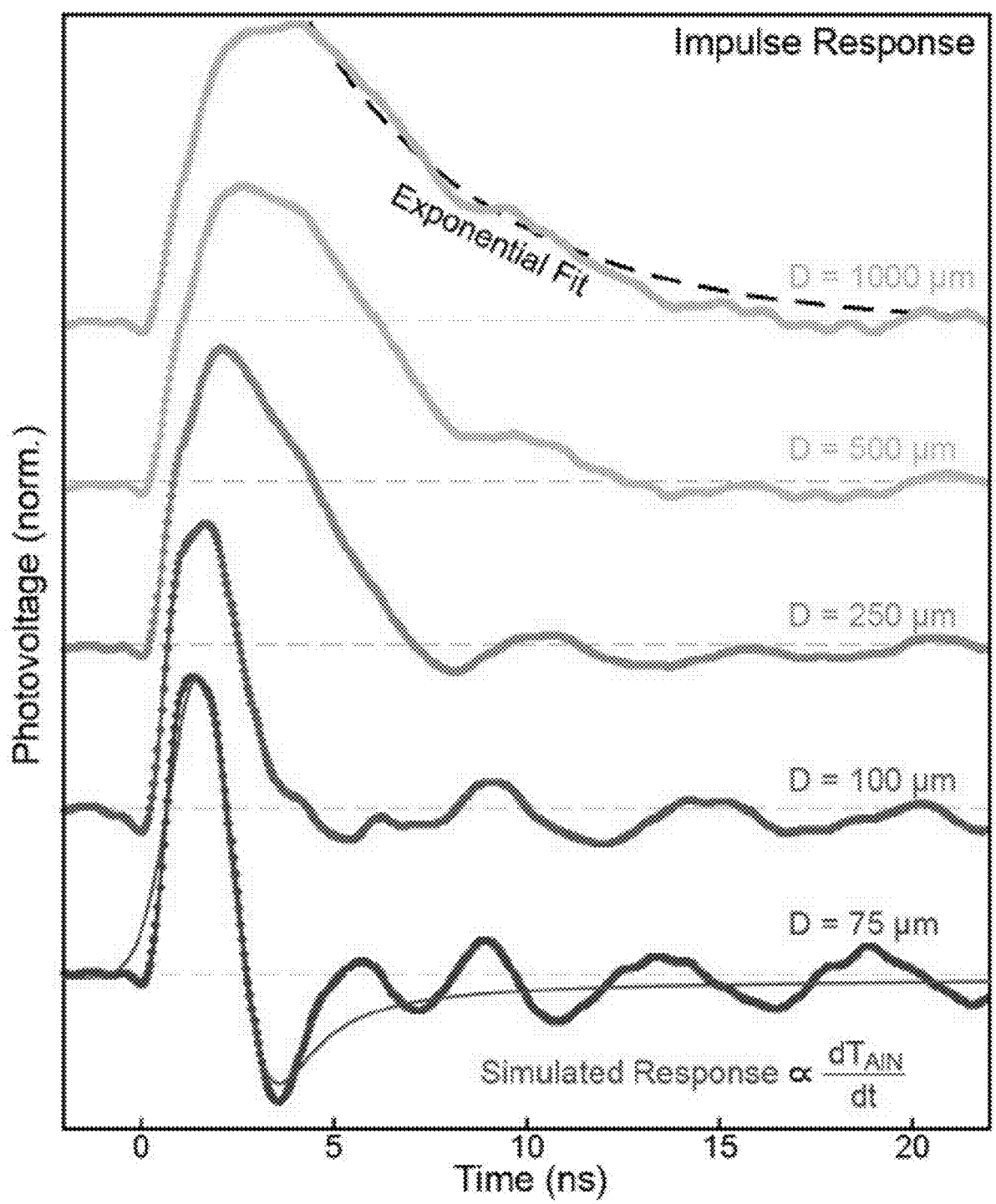
Figure 3B:
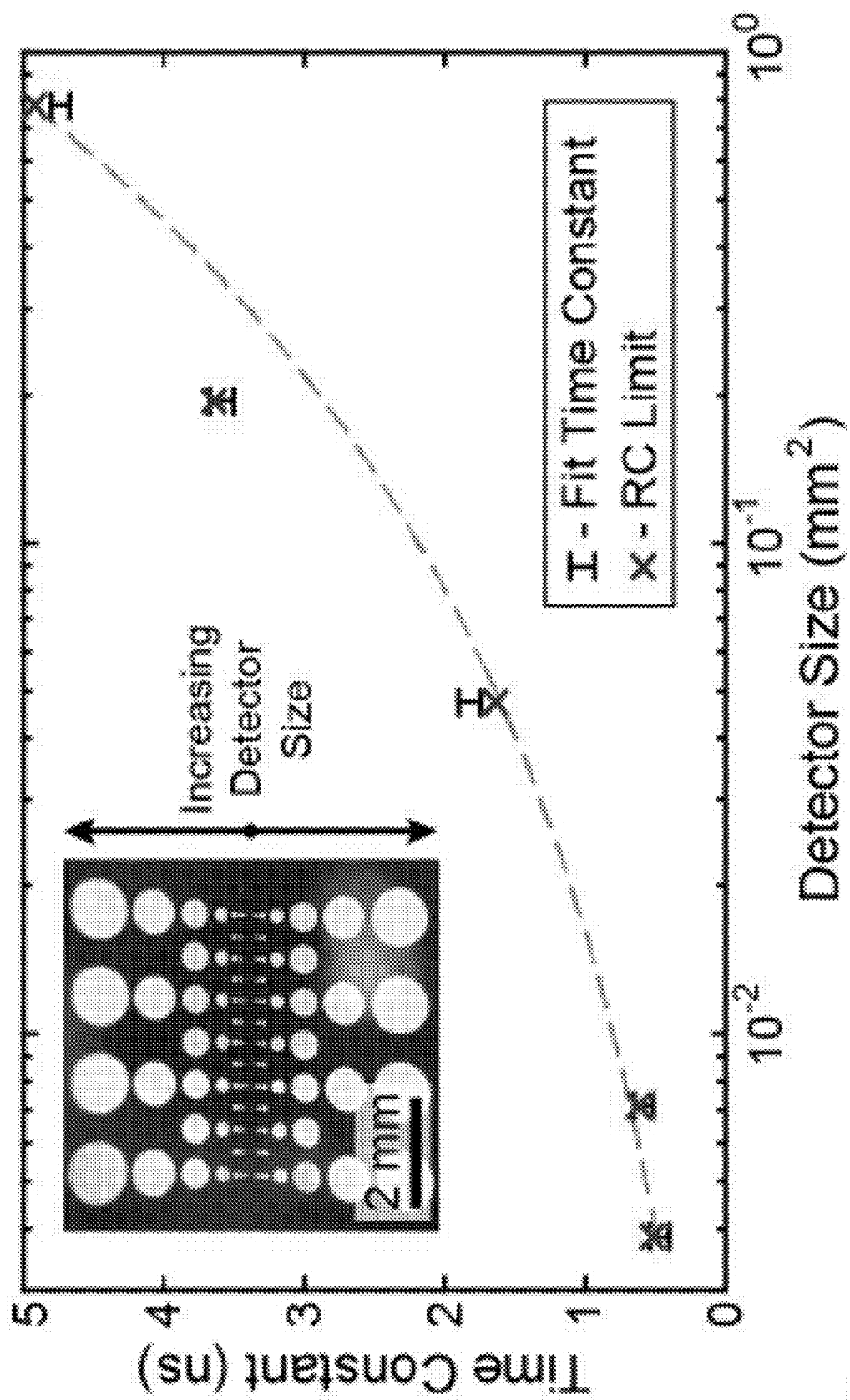
Figure 3C:
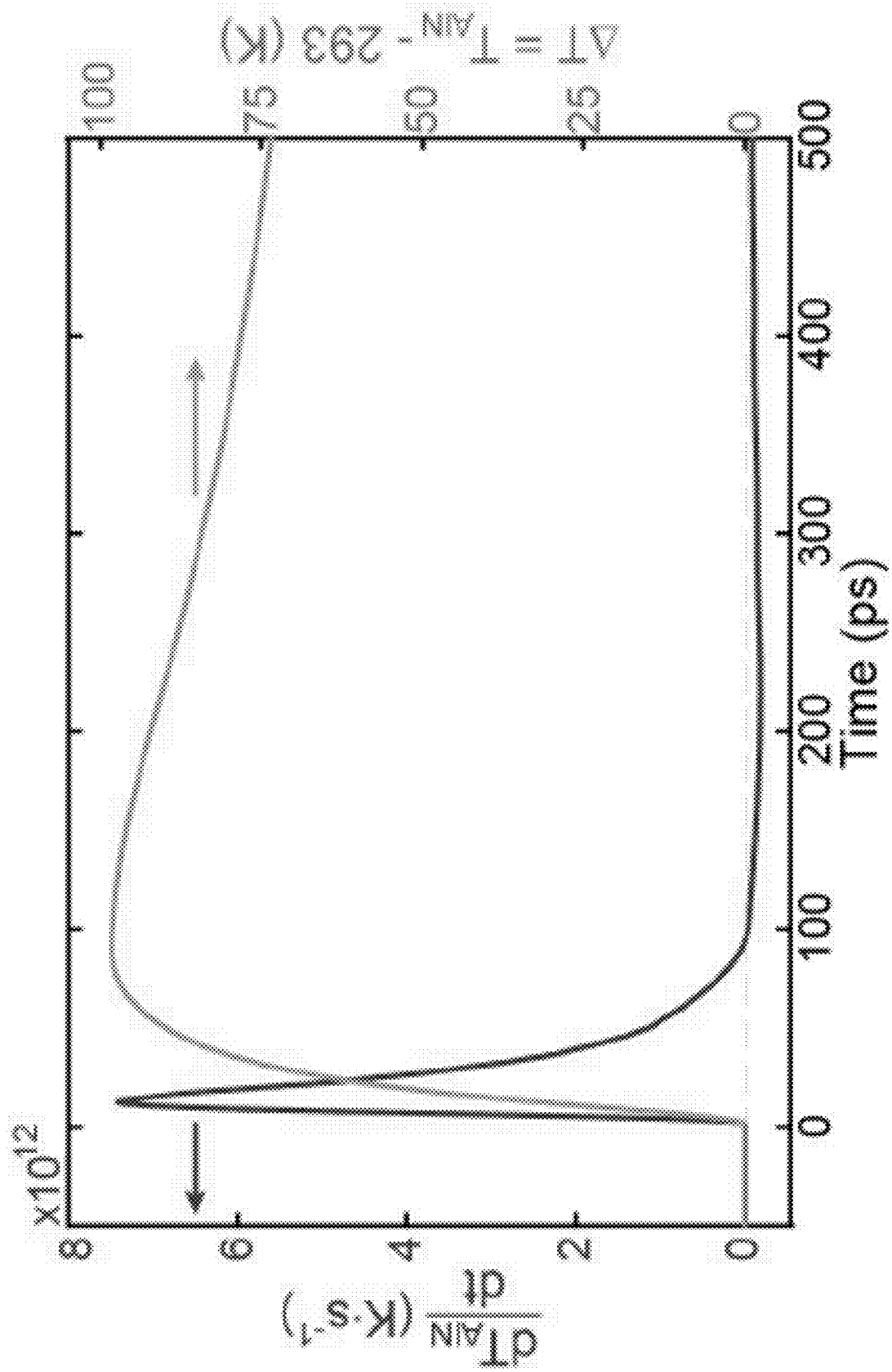
Figure 4A:
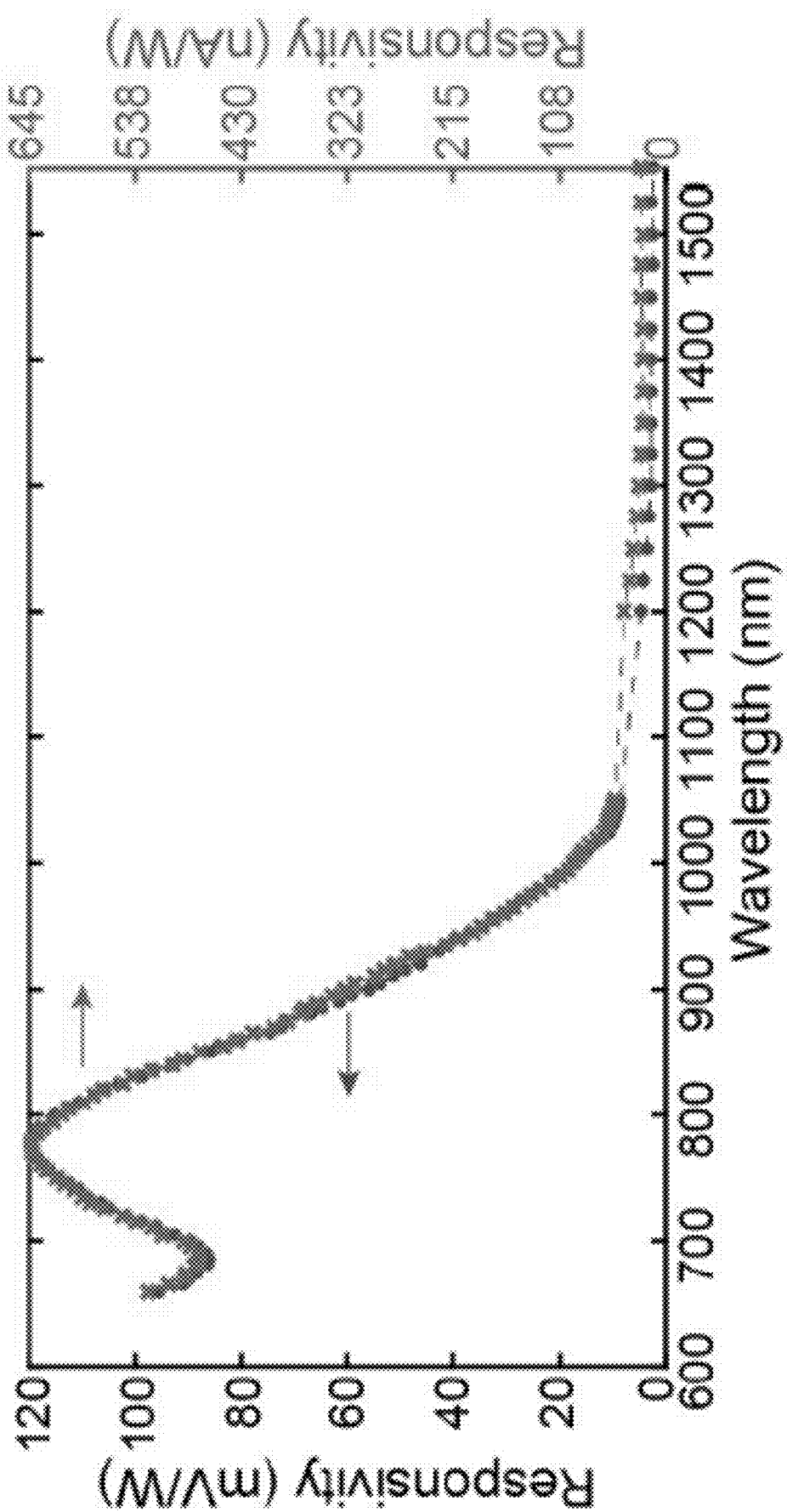
Figure 4B:
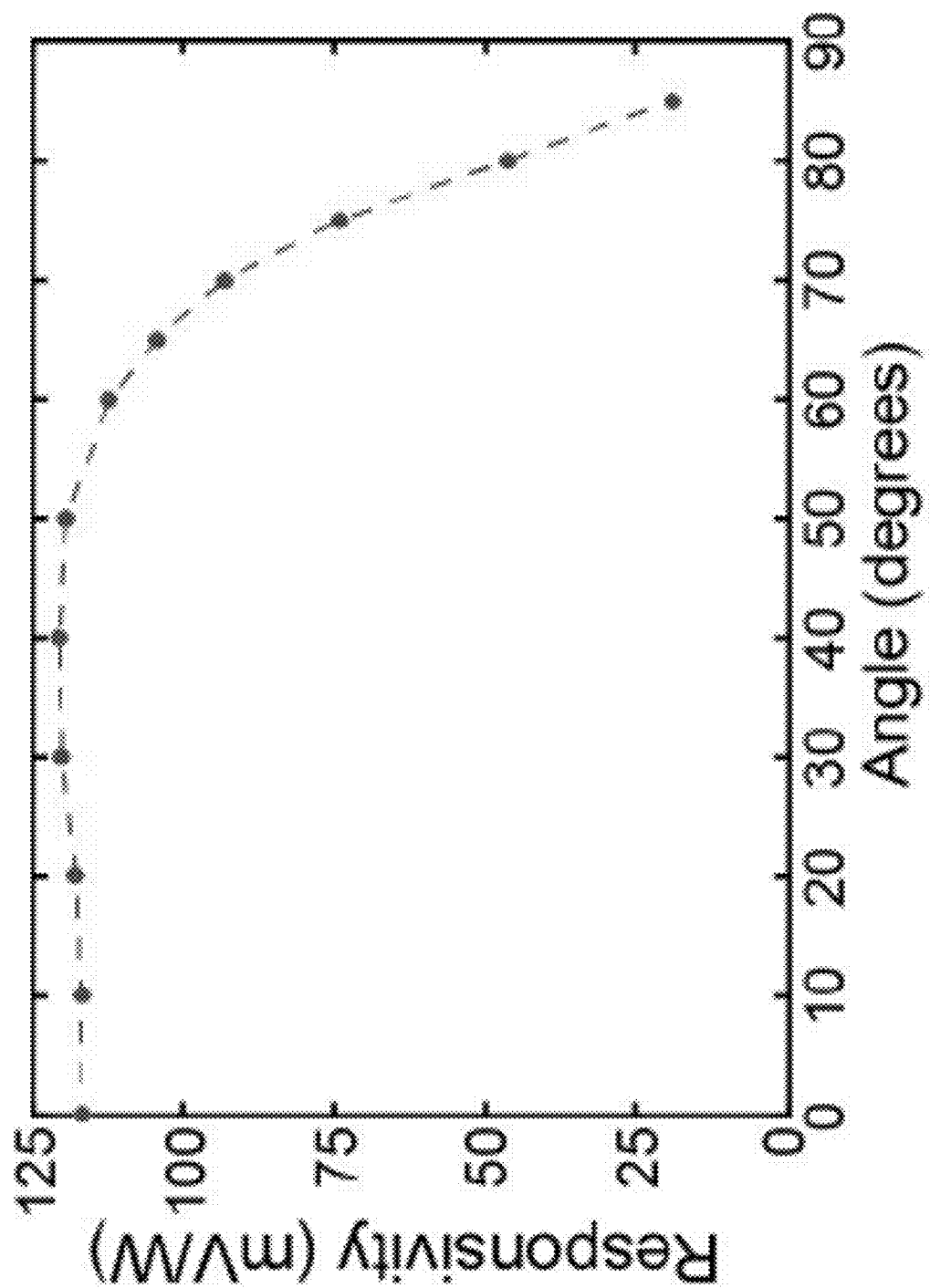
Figure 5A:
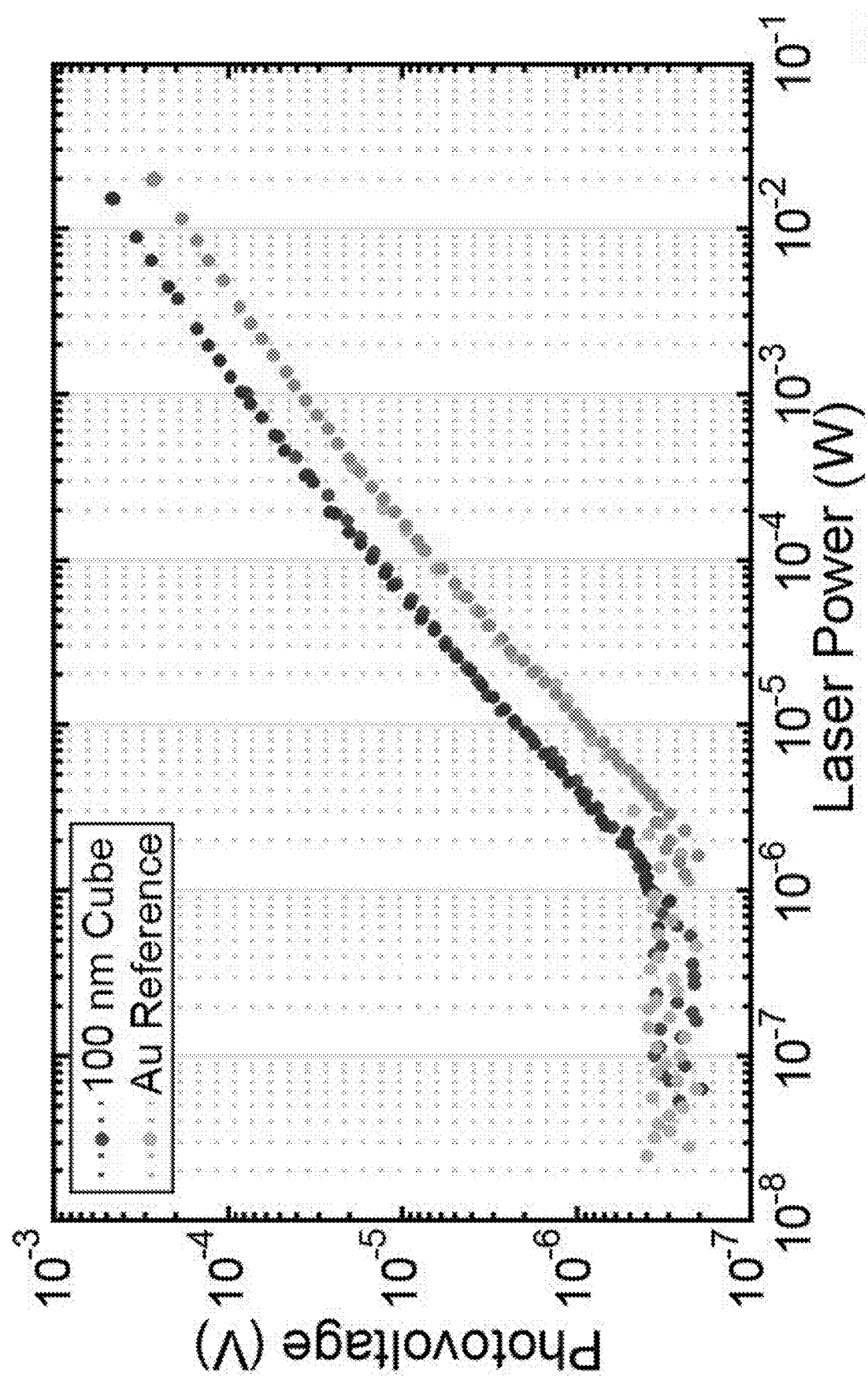
Figures 5B, 5C:
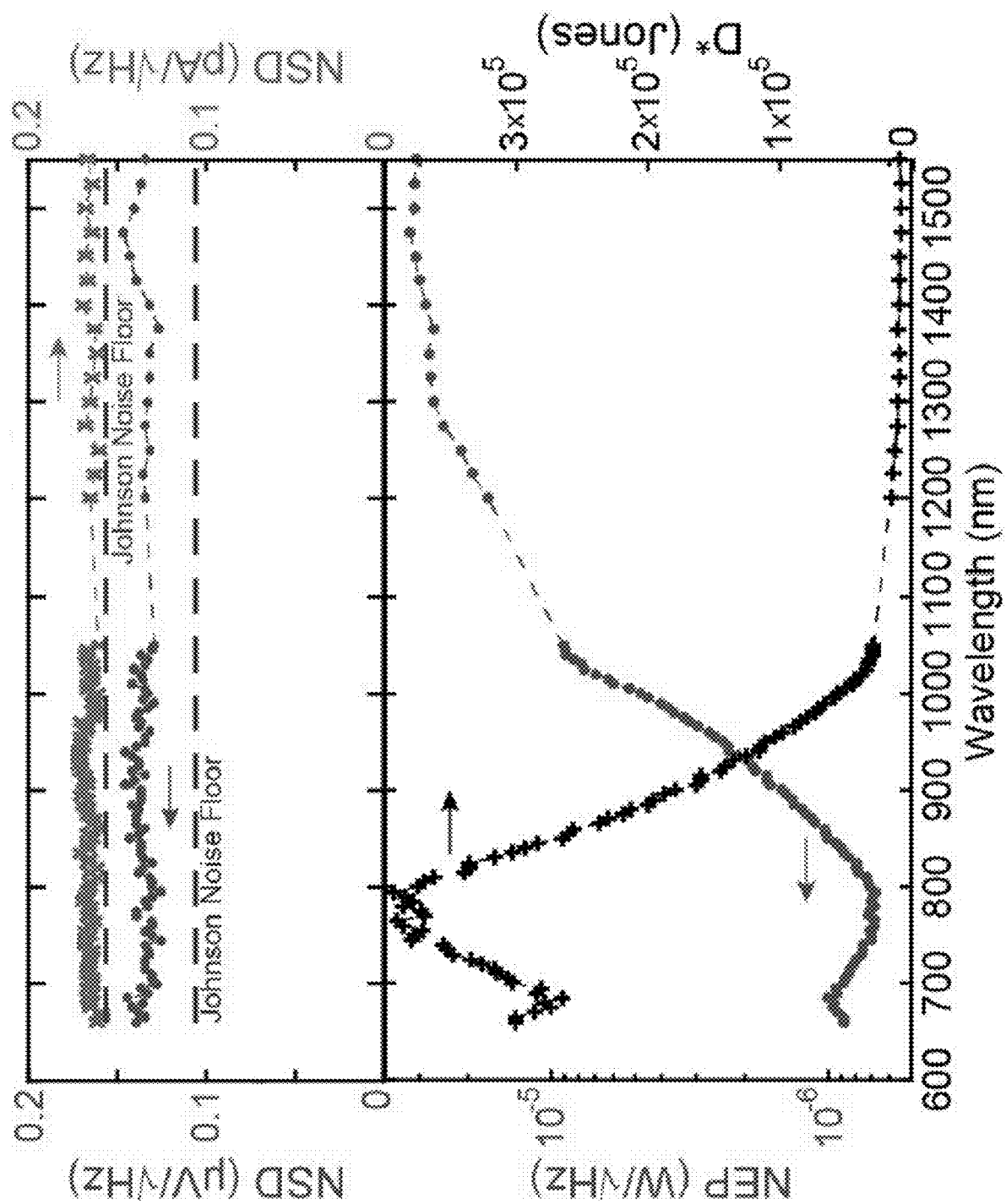
Figure 6:
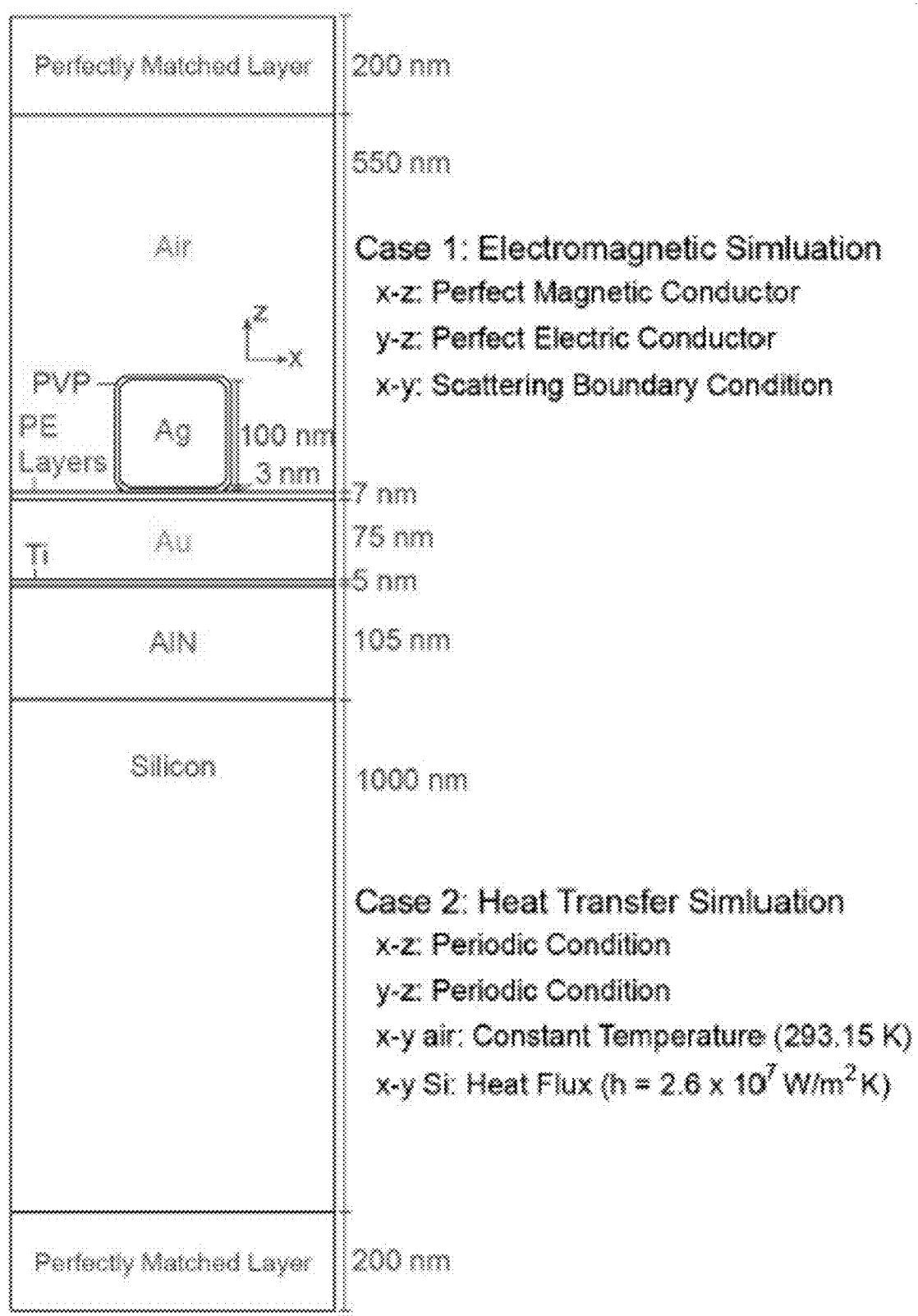
Figure 7A:
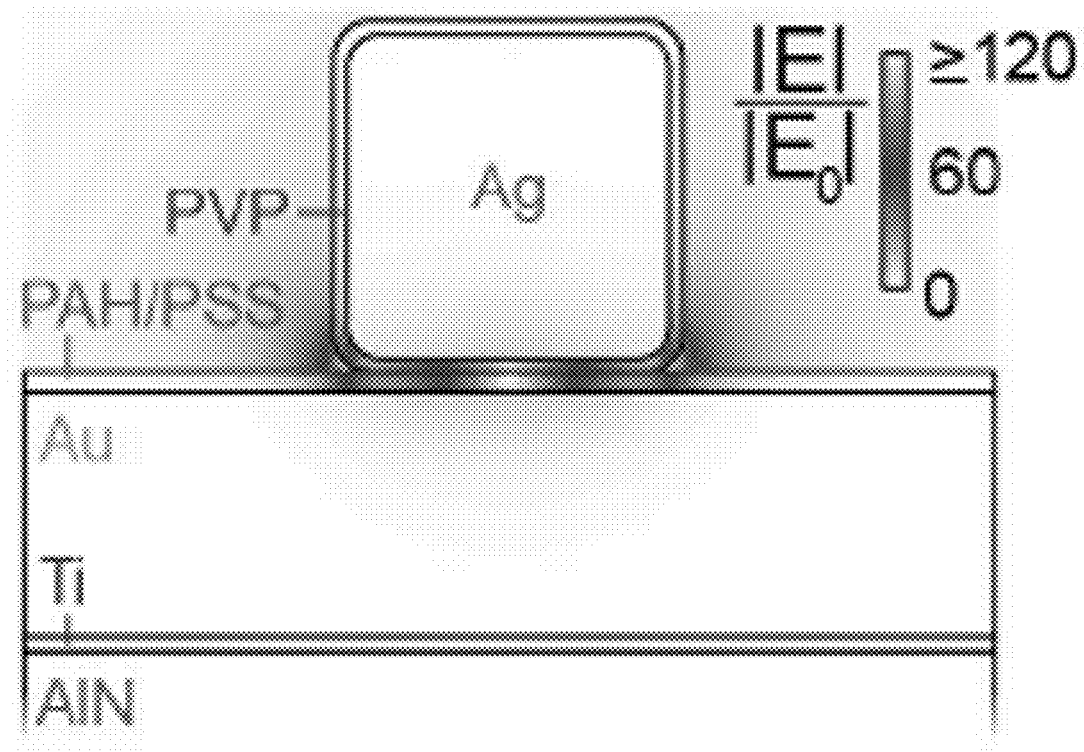
Figure 7B:
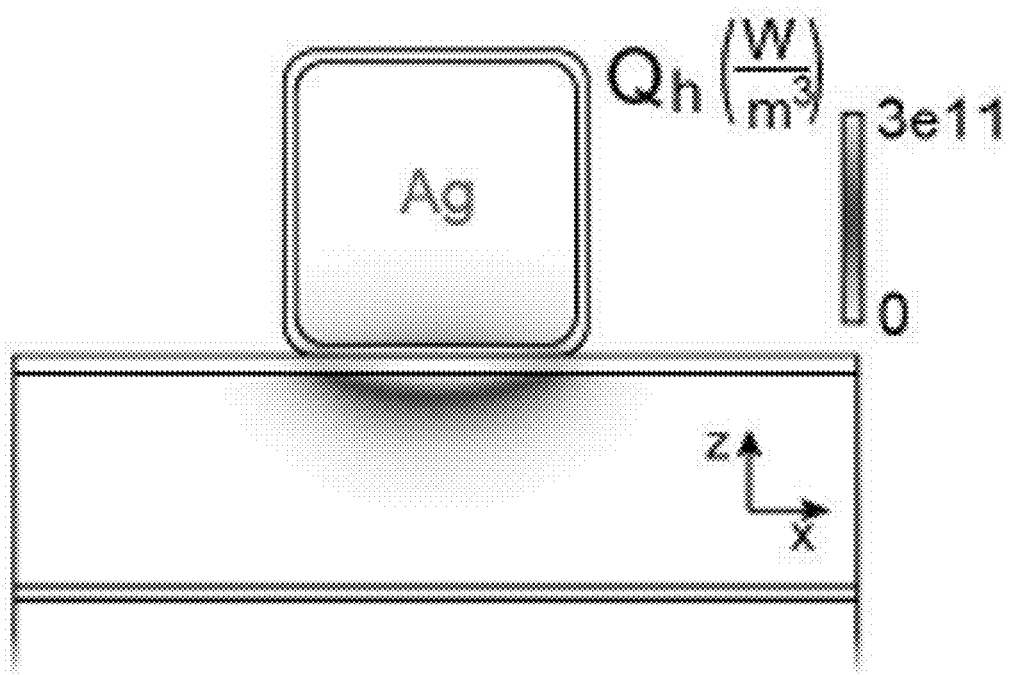
Figure 7C:
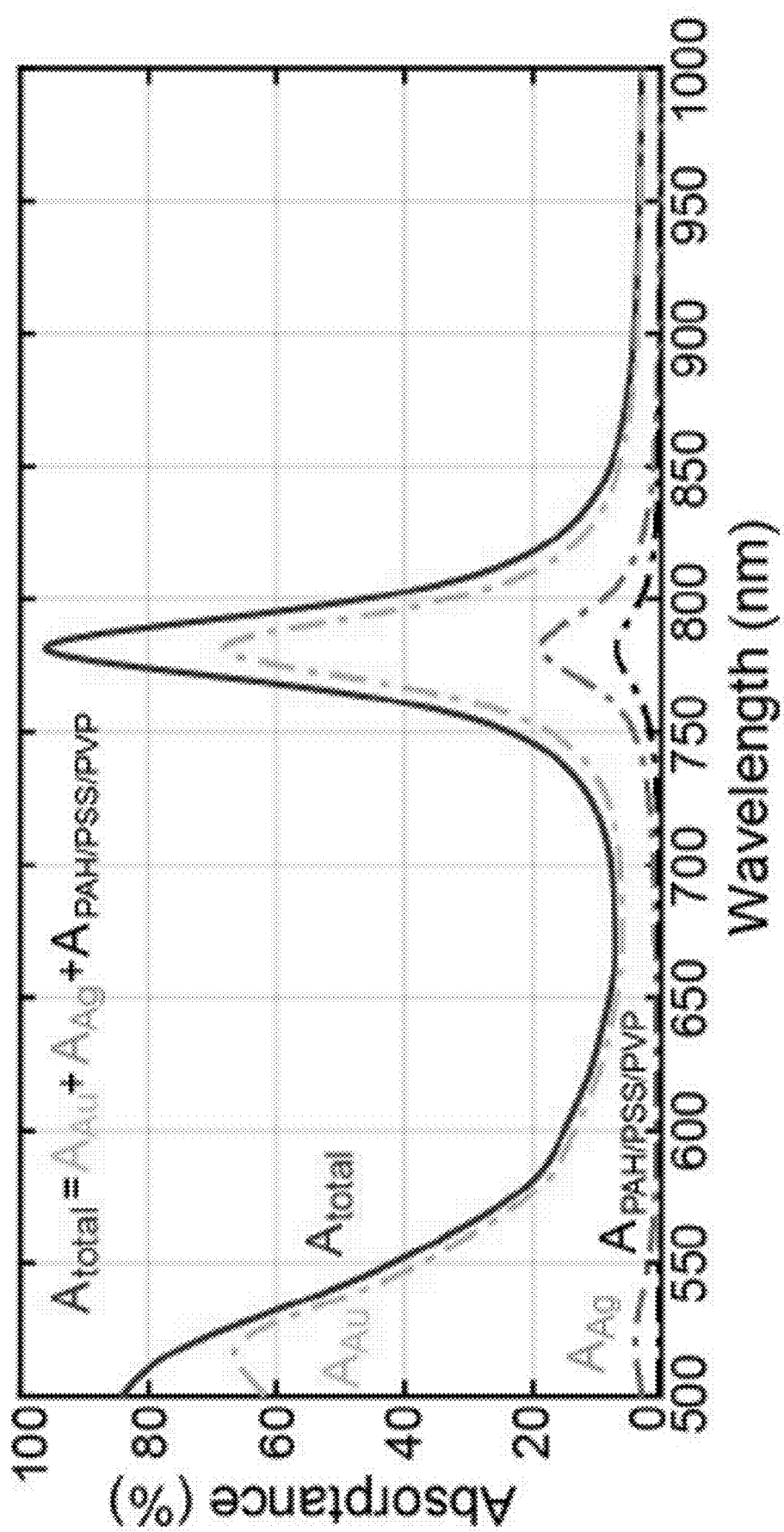
Figure 7D:
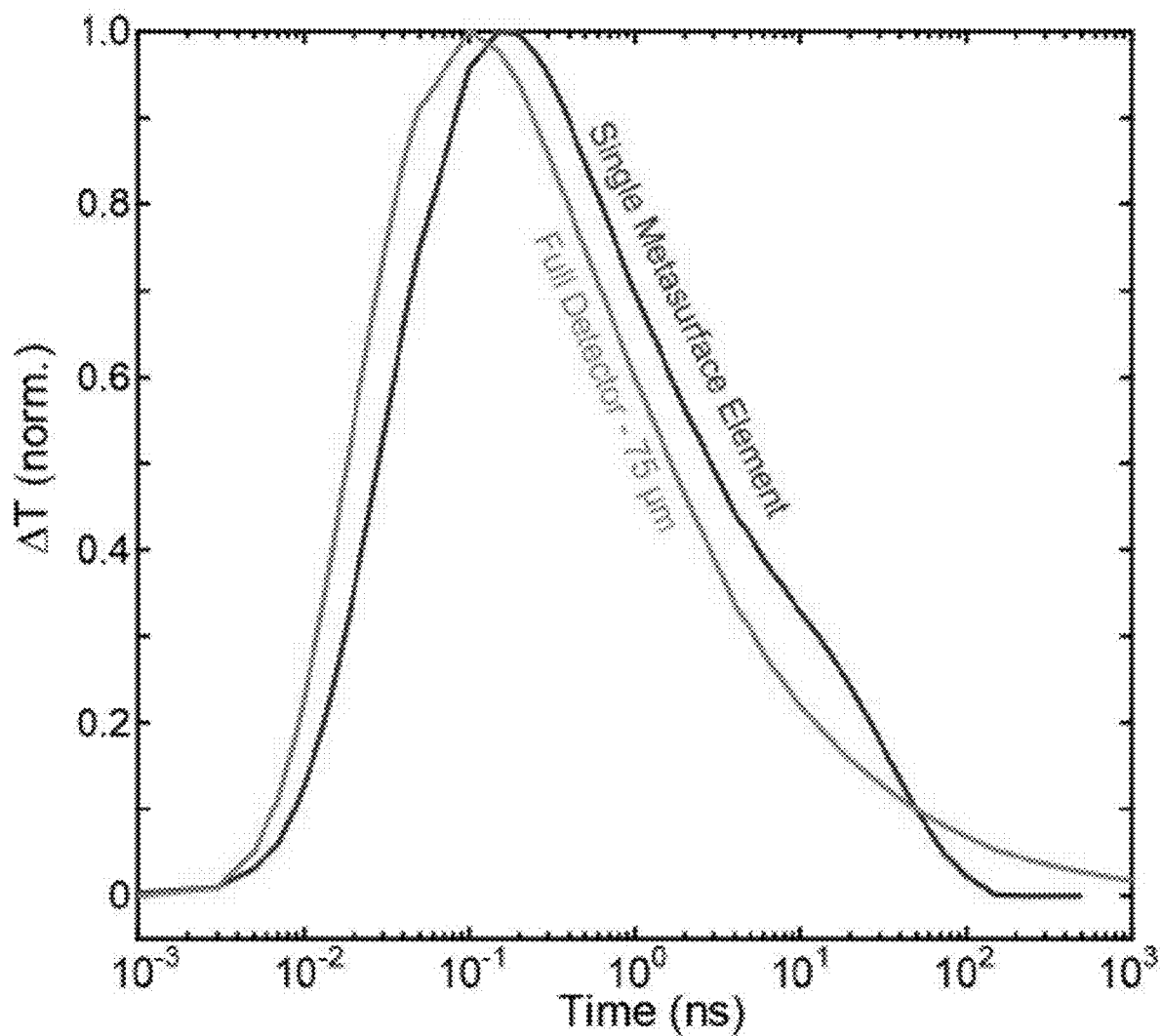
Figure 8A:
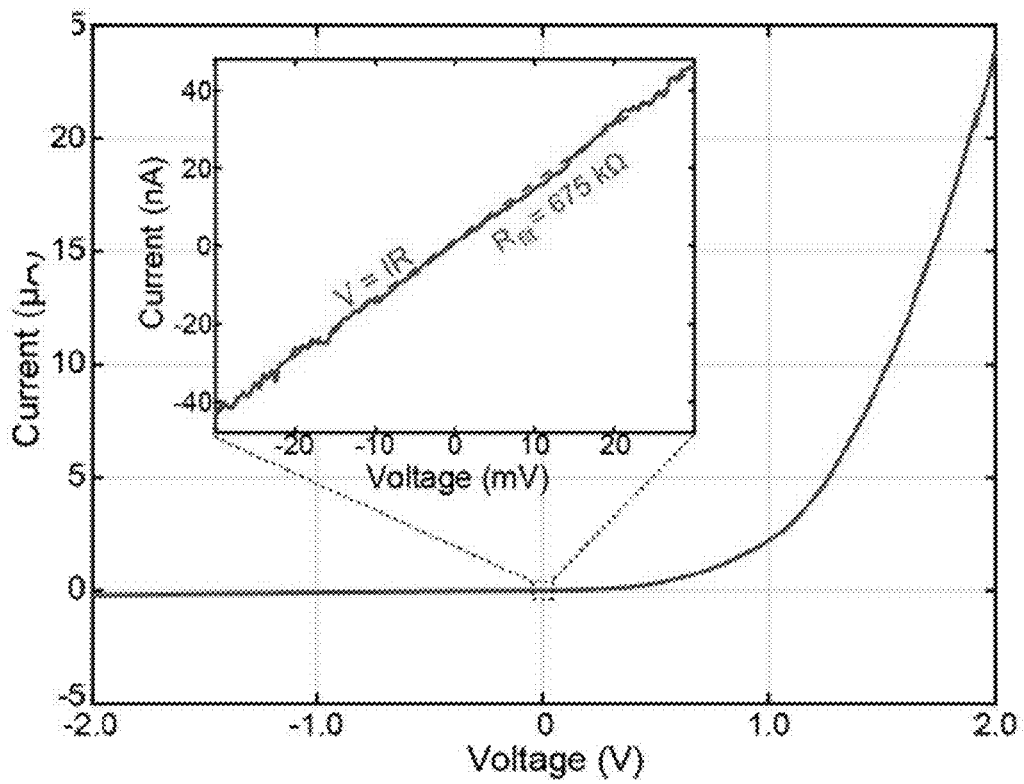
Figure 8B:
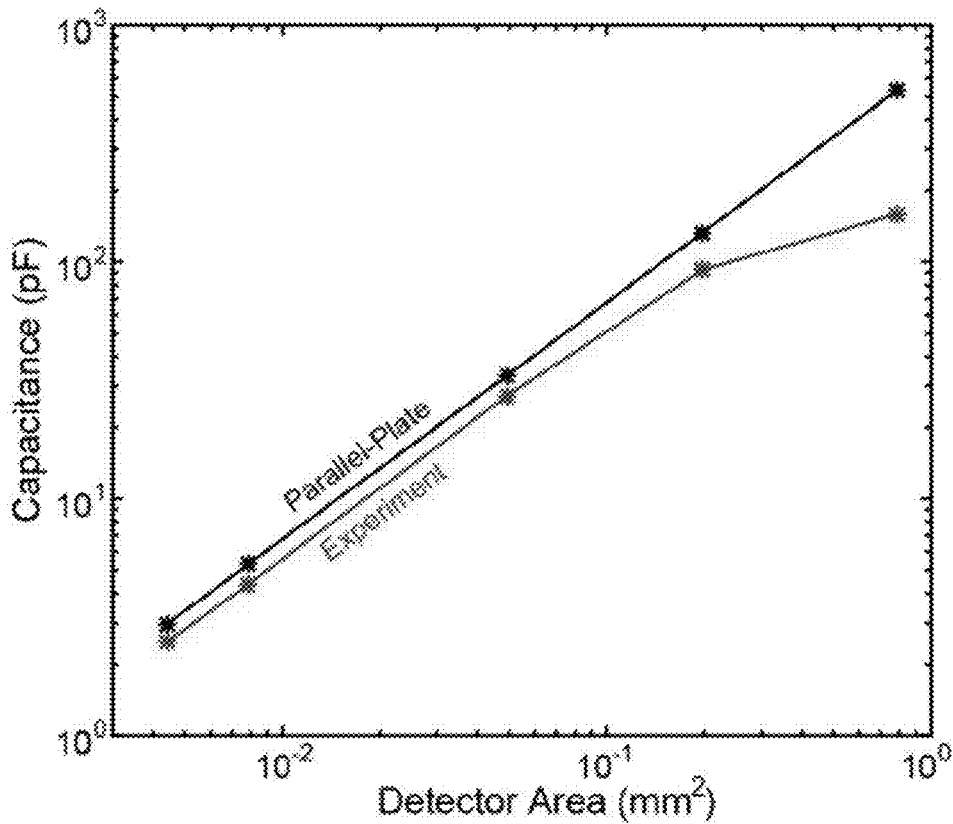

Having thus described the presently disclosed subject matter in general terms, reference will now be made to the accompanying Drawings, which are not necessarily drawn to scale, and wherein:

FIG. 1A is a diagram of an imaging system including a pyroelectric detector in accordance with embodiments of the present disclosure;

FIG. 1B is a diagram of another imaging system including a pyroelectric detector in accordance with embodiments of the present disclosure;

FIG. 2A is a schematic of the vertical detector structure with a plasmonic metasurface deposited on a polycrystalline AlN pyroelectric layer;

FIGS. 2B and 2C are cross-sectional diagrams of pyroelectric detectors in accordance with embodiments of the present disclosure;

FIG. 2D illustrates two graphs that show reflection spectra of three colloidal metasurface-pyroelectric detectors, an Au reference detector and an EBL fabricated metasurface-pyroelectric detector, and normalized photovoltage spectra of the five different detectors showing a clear correlation with the absorption spectra;

FIG. 3A is a graph showing photovoltage impulse response of metasurface-pyroelectric detectors after excitation with a 100 fs laser pulse at time zero;

FIG. 3B is a graph showing size-dependent exponential time constants extracted from fitting each impulse response, which are shown along with the RC-limited responses and a dashed lie to guide the eye;

FIG. 3C shows a graph of simulated thermal impulse response for the 75 µm detector;

FIG. 4A is a graph showing photovoltage and photocurrent responsivities of a detector fabricated with 100 nm nanocubes;

FIG. 4B is a graph showing the angle-dependent responsivity of the same detector showing large responsivities out to 60° angles;

FIG. 5A is a graph showing power dependence of a detector with 100 nm cubes showing the noise floor for powers below 1 µW and a nearly linear photovoltage for increasing powers;

FIG. 5B is a graph showing NSD for both current and voltage measurements of the same detector;

FIG. 5C is a graph showing NEP calculated from the NSD showing microwatt sensitivity similar to the power-dependence noise floor plotted along with the specific detectivity (D*);

FIG. 6 illustrates a schematic of a single metasurface element used for both the electromagnetic and heat transfer simulations and their associated boundary conditions of the metasurface constituents;

FIG. 7A illustrates an electric-field profile of a plasmonic metasurface element at the fundamental plasmon resonance;

FIG. 7B illustrates absorbed power density of nanostructure exposed with an irradiance of 3 W/cm$^2$, showing the majority of absorption occurs in the Au;

FIG. 7C is a graph of simulated spectral absorption showing 96 percent absorption at the fundamental resonance around 780 nm;

FIG. 7D illustrates a graph showing simulated temperature change of AlN film after excitation with a fs-pulse shown for two different simulations;

FIG. 8A is a graph showing the Schottky diode response arising from the contact between the pyroelectric AlN and the Ti adhesion layer;

FIG. 8B is a graph showing the size-dependent capacitance of the metasurface-pyroelectric detectors showing a near-ideal parallel plate capacitance for smaller detector sizes;

FIG. 9A shows a microscope image of the 85×85 µm detector with a 75×75 µm active area;

FIG. 9B shows an SEM image of the detector showing the EBL fabricated nanoparticle array;

FIG. 9C shows an SEM image showing 270 nm Au nanoparticles fabricated on the detector; and FIG. 9D illustrates a cross-section of a single metasurface element in the center of the detector.

SUMMARY

The presently disclosed subject matter relates to pyroelectric detectors with plasmonic structure and methods of making and using same. According to an aspect, a pyroelectric detector includes an artificial optical absorber or plasmonic absorber (e.g., metamaterial absorber) comprising an ensemble of subwavelength conductive components forming a plasmonic structure configured to receive light and to generate thermal energy from the received light. Further, the pyroelectric detector includes a pyroelectric material configured to receive the generated thermal energy from the plasmonic structure and to generate an electrical signal representative of the received thermal energy. Further, the pyroelectric detector includes an electronic component configured to receive the electrical signal from the pyroelectric material for detection of the received light.

According to another aspect, a pyroelectric detector includes a first contact layer. The pyroelectric detector also includes a layer of pyroelectric material having a first and a second side, the first side being attached to the first contact layer. Further, the pyroelectric detector includes a second contact layer attached to the second side of the layer of pyroelectric material. The pyroelectric detector also includes a plasmonic structure attached to the second side of the layer of pyroelectric material. The plasmonic structure is configured to receive light and to generate thermal energy from the received light for receipt of the generated thermal energy by the layer of pyroelectric material such an electrical signal across the first and second contact is generated that represents the received thermal energy.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

In accordance with embodiments, the present disclosure provides a metasurface-pyroelectric detector that possesses picosecond-scale response times and excellent thermal diffusion times. Particularly, in some embodiments, the present disclosure provides a pyroelectric detector integrated with a plasmonic metasurface having a bottom electrode, a pyroelectric material, a plasmonic metasurface acting as an absorber, and top electrode. The absorber can function as an integrated resonant spectral filter, converting light at one or more pre-determined wavelength ranges into heat, which is transferred to the pyroelectric material. Wavelengths off-resonant with the plasmonic absorber may be reflected or scattered and not detected. In other embodiments, the absorber can be electrically conductive, allowing it to act as the top electrode for the detector. In some embodiments, these plasmonic metasurfaces can be made with a variety of approaches such as colloidal self-assembly, nanoimprint lithography, electron-beam lithography, deep-UV lithography, or other approaches.

Metasurface-pyroelectric detectors as disclosed herein can provide several advantages over current pyroelectric detectors. For example, the metasurface-pyroelectric detectors can have a subwavelength plasmonic metasurface absorber that localizes generated heat from light absorption closer to the pyroelectric materials when compared to bulk, micro-structured, or thin-film interference absorbers. As such, the generated heat in a metasurface possessing a high-thermal conductivity can diffuse into the pyroelectric material on the scale of 1's to 100's of picoseconds. The fastest commercial, pyroelectric detectors show microsecond response times, and the detector disclosed herein may improve the device bandwidth into the MHz or GHz regime. In another example, a detector as disclosed herein can eliminate the need for external optical filters, filter wheels, gratings, and other independent selection mechanisms external to the detector. As such, the integrated spectral filter can reduce size, weight, and power considerations by decreasing the detector thickness and complex signal processing algorithms.

As referred to herein, the term "plasmon" may be a coherent oscillation of electrons confined to or within a conductive material (including metals and doped semiconductors) and is a plasmonic material as described herein.

As referred to herein, the terms "an artificial absorber" or "engineered absorber" may be understood to be a structure or material that absorbs incident electromagnetic energy and partially or almost completely suppresses transmission and reflection from the absorbing material.

In another embodiment, a spectrally-selective metasurface absorbers as disclosed herein can have oriented or randomly-oriented, film-coupled plasmonic resonators that are self-assembled onto a metallic film. Other fabrication approaches such as, nanoimprint lithography, electron-beam lithography, or deep-UV lithography, can be used to realize these absorbers. In another embodiment, the fabricated metasurfaces can include metals with high thermal conductivity, subwavelength thickness, and localized absorption near the pyroelectric material. This approach allows these metasurface-pyroelectric detectors to achieve increased response times ranging from the millisecond range down to potentially a few picoseconds.

In other embodiments, the plasmonic absorbers (e.g., metamaterial absorbers) can be fabricated in a single lithography step reducing the cost, complexity, fabrication time, and throughput of wavelength selective detectors when compared to the other techniques. Multiple metasurfaces with spectrally-different resonances can be patterned simultaneously reducing the fabrication difficulty of multispectral pixel arrays. In other embodiments, the absorption spectra of these metasurface absorbers can be controlled by designing the composition and geometry of the subwavelength metasurface elements. The reduced thermal mass from the subwavelength absorber also minimizes the thermal capacitance of the absorber.

Wavelength selective, pyroelectric detectors disclosed herein can provide improvements over state-of-the-art designs as they can eliminate the need for external optical filters, filter wheels, gratings, and other independent selection mechanisms external to the detector. Furthermore, the subwavelength thick plasmonic absorber can significantly reduce the thermal diffusion time into the pyroelectric detection material resulting in an increased bandwidth as compared to traditionally thick absorbers and cavities.

FIG. 1A illustrates a diagram of an imaging system 100 including a pyroelectric detector 102 in accordance with embodiments of the present disclosure. Referring to FIG. 1A, the imaging system 100 also includes a lens 104, signal conditioning circuitry 106, image data processing circuitry 108, and a post processing module 110. The lens 104 can receive light (represented by arrows 112) that traverses thereto and focus the light 112 onto a surface of plasmonic material (generally designated 114). The lens 104 can be mechanically moved and/or adjusted for focusing the light onto the surface.

In this example, the plasmonic structure 114 (e.g., metamaterial) is made of a gold film and can include dispersed silver nanoparticles that are cubical in shape. In another embodiment, the plasmonic structure 114 can be a conductive or metallic film for the wavelengths of interest with a metallic particle separated from the film with a dielectric or semiconductor spacer. For the visible regime (400-700 nm wavelengths) silver, palladium, platinum, aluminum, rhodium, gold or other plasmonic metals can be used. For the near infrared (700-1400 nm), short-wave infrared (1400-3000 nm), mid-wave infrared (3000-8000 nm), and long-wave infrared (8000-15000 nm) metals from visible regime, conductive ceramics such as titanium nitride, highly-doped semiconductors like doped zinc oxide or indium tin oxide, or other high conductivity materials can be used to construct the plasmonic structure. The particles can be cuboid, spherical, cylindrical, or polyhedra in shape with relevant sizes ranging from approximately 40-2000 nm depending upon the target wavelength. The films can be deposited with any physical, vapor or solution-based deposition approaches such that the plasmonic structure is in electrical contact with the pyroelectric film.

The plasmonic structure 114 is part of the pyroelectric detector 102, which also includes pyroelectric material 116 and electronic components configured to receive or otherwise sense an electrical signal of the plasmonic structure 114 that is representative of the light focused on the surface of the plasmonic structure 114. Particularly, light received at the plasmonic structure 114 causes the structure 114 to increase in heat such that thermal energy conducts towards the pyroelectric material 116. The traversal of the thermal energy to the pyroelectric material 116 is generally represented by curved arrows 118. The pyroelectric material 116, in this example, has temperature-dependent spontaneous polarization characteristics such that on heating its polarization is altered. The pyroelectric material 116 can be a layer positioned between a top contact layer and a bottom contact layer 120. Since the pyroelectric material 116 is positioned between the contact layers, electrical charges accumulate on the conductor-pyroelectric interfaces in an amount proportional to the polarization. Time-varying optical/thermal signals alter the density of interfacial charges in the layered structure to thereby generate a pyroelectric voltage, which drives a current when the contact layers are connected to other electronic components, such as the components of a digital camera as shown in FIG. 1A.

In this example, the pyroelectric material 120 is a polycrystalline aluminum nitride (AlN) pyroelectric layer. Alternatively, the pyroelectric material 120 may be made of crystalline or polycrystalline materials such as zinc oxide, lithium niobite, lithium tantalate, or other pyroelectric materials of thicknesses ranging between approximately 10-1000 nm. The pyroelectric films can be grown with any physical, vapor or solution-based deposition approach that results in a crystalline or polycrystalline film. In another embodiment, the pyroelectric film is grown directly onto a conductive film or substrate to form the bottom electrical contact. In another embodiment, a bulk pyroelectric crystal is etched to the desired thickness and the detector is formed around the etched crystal.

The contact or conductive layers can be made of gold and silicon, respectively, in this example. Alternatively, the conductive layers may be made of any electrically conductive material suitable for processing of the pyroelectric-metasurface detector such as highly doped semiconductors or metals with thicknesses ranging from approximately 5 to 250 nm. In another embodiment, a conductive substrate can be use as the conductive contact. In another embodiment, the conductive contact to the pyroelectric material is accomplished when electrically bonded to an integrated readout circuit to capture and condition the generated electrical signal from light absorption. In another embodiment, the pyroelectric material and metasurface can be etched or formed into pixels where each pixel is electrically connected to a concomitant pixelated readout circuit.

Electrical signals output from the pyroelectric detector 102 can be received by signal conditioning circuitry 108 configured to filter, amplify, or otherwise condition the received electrical signals. The conditioned, electrical signals may be output to the post processing module 110 that is configured to generate a digital representation of the analog electrical signal. This digital representation may be data image that is in suitable form for display or other presentation to a user. This image data may be stored at image data storage or other memory. Subsequently, a display may be controlled to display an image or video of the image data, which is representative of the received light 112.

FIG. 1B is a diagram of another imaging system including an array of pyroelectric detectors in accordance with embodiments of the present disclosure. This example may be referred to as a pixelated camera. This detector is similar to the detector shown in FIG. 1A except that this detector has separated "pixels" of the plasmonic structure 114, the pyroelectric material 116, and the bottom contact layer 120. The pixels can be formed with lithography or etching to electrically and thermally isolate individual pixels. Each individual pixel can receive light and generate an electrical signal and when paired with an optical imaging system can be used as an imaging system. Further, each pixel can absorb and detect light of different wavelengths corresponding to the design of the plasmonic absorber with each pixel.

An example application of the systems and methods disclosed herein include, but are not limited to, agricultural imaging and video capture. For example, an aerial vehicle, such as a drone, may be equipped with an imaging system as disclosed herein for capturing images and video of crops. These captured images and video may be used for obtaining high resolution images of the crops and for constructing spectral signatures, also referred to as spectral fingerprints, from the reflectivity spectrum across a wide wavelength range ranging from the UV to the near-, mid-, or longwave infrared or beyond. Such images may be analyzed for use in determining areas for applications of fertilizers, pesticides, and/or herbicides.

An example application of the systems and methods disclosed herein include, but are not limited to, environmental monitoring and imaging. For example, an aerial vehicle, such as a drone, may be equipped with an imaging system as disclosed herein for capturing images and video. These captured images and video may be used for obtaining high resolution images capable of characterizing soil type, identifying plant species, and tracking pollution. Such images may be analyzed for use in determining areas for preservation and conservation.

An example application of the systems and methods disclosed herein include, but are not limited to, process and quality control monitoring. For example, a manufacturing or quality control system may be equipped with an imaging system as disclosed herein for capturing images and video of manufactured items or raw materials. These captured images and video may be used for identifying faulty materials or devices, sorting various materials into categories, or identifying counterfeit items.

An example application of the systems and methods disclosed herein include, but are not limited to, food safety monitoring. For example, a quality control system may be equipped with an imaging system as disclosed herein for capturing images and video of food and consumables. These captured images and video may be used for identifying rotten or spoiled food or identifying non-food contamination.

An example application of the systems and methods disclosed herein include, but are not limited to, drug safety monitoring. For example, a quality control system may be equipped with an imaging system as disclosed herein for capturing images and video of manufactured drugs. These captured images and video may be used for identifying counterfeit or contaminated drugs.

An example application of the systems and methods disclosed herein include, but are not limited to, water safety monitoring. For example, an aerial vehicle, such as a drone, may be equipped with an imaging system as disclosed herein for capturing images and video. These captured images and video may be used for obtaining high resolution images capable of tracking water pollutants and identifying algae blooms.

An example application of the systems and methods disclosed herein include, but are not limited to, assisting cancer detection and image guided surgery. For example, an operating room or physician's office may be equipped with an imaging system as disclosed herein for capturing images and video of the patient. These captured images and video may be used for identifying cancerous tissue or diseased tissue for guiding surgery or removal of said tissue. An example application of the systems and methods disclosed herein include, but are not limited to, use within an instrument to measure light or detect gas concentrations and gas leaks. For example, a monitoring system may be equipped with an imaging system as disclosed herein for capturing images and video of a scene of interest. These captured images and video may be used for identifying and characterizing gas concentrations and gas leaks.

An example application of the systems and methods disclosed herein include, but are not limited to, use for computer vision for automated systems. For example, an automated system may be equipped with an imaging system as disclosed herein for capturing images and video of a scene of interest. These captured images and video may be used for identifying hazardous terrain or environmental features.

Other applications of the systems and methods disclosed herein can be used as a component in scientific instruments for material differentiation/characterization and spectral characterization.

In accordance with embodiments, a pyroelectric detector as disclosed herein may be integrated with a plasmonic absorber that provides spectrally selective detection of radiation at high speeds. The detector may include a bottom electrode and a pyroelectric material having a plasmonic metasurface acting as an absorber. Further, the detector may include a top electrode.

In embodiments, a conductive silicon wafer can be used as both a substrate and bottom electrode contact for the pyroelectric detector. In an alternative embodiment, the pyroelectric detector can be fabricated by reactively sputtering a refractory metal or other suitable conductor stable at high temperatures as the bottom electrode contact on an electrically insulating wafer. In other embodiments, a pyroelectric material may subsequently be grown on the bottom electrode contact. Any suitable pyroelectric material and growth process can be used. In embodiments, the pyroelectric material can include reactively-sputtered aluminum nitride (AlN). In other embodiments, etching or other lithographic processes may be used to fabricate individual pixels to a desired size and array.

In other embodiments, a film of a suitably conducting material is deposited over the pyroelectric material. In some embodiments, the surface roughness of the conductive film can be low for optimum metasurface performance. In other embodiments, a dielectric spacer layer of suitable thickness can be deposited, followed by the self-assembly of the metallic particles to create the absorbing metasurface. In other embodiments, nano-imprint, deep-UV, electron-beam lithography or other approaches can be used to pattern the metallic particles on the surface. For back thinned and undercut pyroelectric detector pixels, the substrate can be back thinned or undercut using etch processes to add thermal isolation. In other embodiments, a passivation layer of a suitable electrically insulating material between the metallic film and bottom electrode contact can prevent short circuiting of the detector.

Pyroelectric detectors as disclosed herein can advantageously, for example, eliminate the need for external optical filters, filter wheels, gratings, and other independent selection mechanisms external to the detector. Furthermore, the subwavelength thick plasmonic absorber can significantly reduce the thermal diffusion time into the pyroelectric detection material resulting in an increased bandwidth as compared to traditionally thick absorbers or cavities.

In accordance with embodiments, thin film, thermally non-insulated pyroelectric detection pixels are disclosed. A thin film, thermally non-isolated pyroelectric detection pixel may be considered a simple embodiment of a pyroelectric detector integrated with a plasmonic near-perfect absorber. For a first demonstration using such an embodiment, 100, 125, and 135 nm edge length silver nanocubes can be self-assembled on a 5 nm thick multilayer film of poly(allylamine hydrochloride) and poly(styrene sulfonate). The multilayer polymer film in turn is self-assembled onto a 75 nm thick gold film electron beam evaporated at 2 Å/s onto a 5 nm titanium adhesion layer (5 Å/s) on the AlN film on conductive n-type, (111) silicon. The self-assembly process results in a monolayer of nanocubes spread uniformly across the device pixel surface. Localized regions of slight aggregation and shape impurities (rods, triangles, etc.) contribute to off resonant scattering. The nanocube size, spacing, and distance above the gold conductive film can control their absorption and reflection spectra, and by extension, the wavelength selectivity of the pyroelectric detection element.

Spectral filtering by the plasmonic absorber results in the detector photovoltage spectrum mirroring the absorber absorption spectrum. In embodiments, a thin film thermally non-isolated pyroelectric detection pixel using a 105 nm thick may be used, reactively sputtered aluminum nitride film as the pyroelectric material. The absorption spectrum of an ensemble of self-assembled 100 nm silver nanocube absorber exhibits 11.1 dB of spectral selectivity at 780 nm, which corresponds to 98.1% peak absorption.

In experiments, the photovoltage spectrum was measured using a supercontinuum laser tunable from 660 nm to 1600 nm and chopped at 137 Hz with a mechanical chopper. Wavelength selectivity of the detector photovoltage spectrum peaked at 41 dB between the resonance at 780 nm and the longest wavelength measured of 1600 nm. The impulse response of the fastest detector showed an instrument-limited 10%-90% rise time of 700 ps, measured using 800 nm, sub-100 fs laser pulses with a 1 GHz oscilloscope. The impulse response demonstrated a −3 dB electrical bandwidth of 300 MHz. Finite-element simulations convoluted with the instrument response agree directly with the experiments. These finite-element simulations reveal the possibility of achieving a fundamental 7 ps rise time with this geometry. The noise equivalent power (NEP) was 679 nW/Hz$^{0.5}$ with a corresponding specific detectivity (D*) for a non-isolated 5 mm diameter detector was $3.9*10^5$ cm*Hz$^{0.5}$/W.

Experiments were conducted to experimentally and computationally demonstrate the pico- and nanosecond dynamics of a room-temperature pyroelectric photodetector that is integrated with a metallic metasurface that acts as an absorber and on-chip spectral filter. The dimensions of the metasurface elements, and thus their associated plasmon resonance, solely define the detection wavelength of the detector without restrictions imposed by the bandgap of the material or intrinsic absorption features. Leveraging colloidal deposition and lithographic techniques, a pyroelectric detector with subnanosecond rise times and responsivities up to 180 mV W−1 was demonstrated. The detector structure includes a film coupled plasmonic metasurface deposited on top of an aluminum nitride (AlN) pyroelectric film deposited on a p-type Si substrate as shown in FIG. 2A, which illustrates a schematic of the vertical detector structure with a plasmonic metasurface deposited on a polycrystalline AlN pyroelectric layer. With continuing reference to FIG. 2, the inset is a scanning electron microscope (SEM) image of the fabricated metasurface with 100 nm Ag cubes. Light incident on these photodetectors can interact with the resonant plasmonic metasurface giving rise to the dip in reflectance shown in FIG. 2D, which illustrates a graph at the top that shows reflection spectra of three colloidal metasurface-pyroelectric detectors, an Au reference detector and an EBL fabricated metasurface-pyroelectric detector. Inset of FIG. 2D is an image of the 135 nm cube metasurface-pyroelectric detectors with 3.0, 2.0, 1.5, and 10.0 mm diameters. The bottom graph of FIG. 2D shows normalized photovoltage spectra of the five different detectors showing a clear correlation with the absorption spectra.

At the fundamental plasmonic resonance, over 98% of the incident optical energy is converted into localized charge density oscillations confined to the metallic surfaces (that is, localized surface plasmons) between the Ag nanocube and the Au film. Subsequently, the localized surface plasmons decay at femtosecond time scales and generate heat through electron-phonon scattering of the order of several picoseconds. The generated heat then diffuses through the 75-nm-thick Au film into the underlying AlN of the order of tens of picoseconds. FIGS. 2B and 2C are cross-sectional diagrams of pyroelectric detectors in accordance with embodiments of the present disclosure. Particularly, FIGS. 2B and 2C show thermal impulse response within a single metamaterial element 1 ps and 40 ps, respectively, after a 100 fs excitation optical pulse. A simulated heat map illustrates this diffusion process in FIGS. 2B and 2C. Pyroelectric materials, such as AlN, possess a temperature-dependent spontaneous polarization and on heating their polarization is altered. Uniquely, pyroelectric materials exhibit increased pyroelectric coefficients when heated below their Curie temperature, which is ~2,000° C. for AlN and are thus well suited to ambient—or above-ambient-temperature operation. Sandwiching the pyroelectric material between two conductive films allows electrical charges to accumulate on the conductor-pyroelectric interfaces in an amount proportional to the polarization as shown in FIGS. 1B and 1C. It is noted that PAH represents poly(allylamine) hydrochloride, PSS represents polystyrene sulfonate, and PVP represents polyvinylpyrrolidone.

Time-varying optical/thermal signals alter the density of interfacial charges in the sandwiched structure generating a pyroelectric voltage, which drives a current $i_p$ when connected to an external circuit as shown in Equation (1) below, where A is the detector area, p is the pyroelectric coefficient and dT/dt is the rate of temperature change of the pyroelectric film.

$$i_p(t) = A_p dT(t)/dt \qquad (1)$$

The produced time-varying pyroelectric signal is measured using a phase-sensitive electrical detection scheme using a lock-in amplifier.

Experimentally, the colloidal metasurface-pyroelectric detectors are fabricated with two readily established techniques for both the pyroelectric films and for the metasurfaces capable of realizing detectors ranging from 0.0044 mm$^2$ to 7.0 mm$^2$ over wafer-scale areas. A top-down SEM image in FIG. 2A shows the uniformity of the self-assembled 100 nm Ag nanocubes on an Au film. Electron beam lithography (EBL) was used to fabricate resonances further into the infrared by interchanging the Ag nanocubes with 40-nm-thick Au nanoparticles with larger edge lengths. To characterize the spectral responsivity, five spectrally different detectors were fabricated as shown in FIG. 2D, where three consist of colloidal metasurfaces with varied resonances by depositing 100, 125 or 135 nm edge length cubes, one consists of 250 nm edge length Au nanoparticles patterned with EBL and the final one consists of an Au film as a control. The metasurface-pyroelectric detectors were exposed to a chopped, tunable laser and the resultant photovoltage was measured for each wavelength. FIG. 2D shows clear agreement between the absorption spectra and responsivity, where the peak responsivities ranged between 0.11 and 0.18 V W−1 for the 7.0 mm$^2$ colloidal metasurfaces and showed greater than 30 dB of selectivity between the wavelengths of fundamental resonance and 1,500 nm. The increasing responsivity of the Au control for shorter wavelengths occurs due to the interband absorption of Au, and can be reduced through the use of different plasmonic materials such as Pt, Ag and Al or mitigated through background subtraction. The EBL metasurfaces similarly show an agreement between the absorption spectrum and the spectral responsivity peaking at 0.33 mV W$^{-1}$ for the 1,900 nm wavelength for a 0.0072 mm$^2$ detector. By varying the nanoparticle size, the resonances of the metasurface-pyroelectric detectors displayed photovoltages between 660 and 2,000 nm, surpassing the spectral range of conventional InGaAs detectors.

The inherent speed of these metasurface-pyroelectric detectors was found through analyzing the impulse response dynamics. Experimentally, the impulse response was measured by exciting the detectors with a 1 kHz, 100 fs laser at a wavelength of 800 nm. Two physical mechanisms determine the ultimate speed of these detectors: the thermal time constant and the electrical time constant. The simulated temperature change, dT/dt, found with COMSOL shows a 6 ps rise time with a 25 ps full width at half maximum (FWHM), which is significantly faster than the instrument and electrical responses in the actual device. As such, the capacitance of the sandwiched pyroelectric detectors is the dominant temporal aspect, due to the slower resistance-capacitance (RC) time constant. To experimentally investigate the temporal dependence of the metasurface-pyroelectric detectors, the capacitance of the detectors was varied by fabricating detectors with diameters ranging from 75 to 1,000 µm. The impulse response for five different detector sizes is shown in FIG. 3A along with the simulated response for the 75 µm detector. For each detector size, the impulse response was fit to a single-exponential decay and the extracted time constant is plotted according to the detector area in FIG. 3B. The total RC time constant of the detector, probe and oscilloscope is also overlaid on the size dependence. The agreement between the RC time constant and the extracted exponential decay indicates that the RC time constant is indeed the dominant temporal factor for these detectors. Even with the RC-limited responses, the thermal detectors achieved response times down to a 500 ps exponential decay, a 1.67 ns FWHM and a 300 MHz bandwidth.

FIG. 3A is a graph showing photovoltage impulse response of metasurface-pyroelectric detectors after excitation with a 100 fs laser pulse at time zero (0 ns). Detectors with different diameters, D, show varying response times and are overlaid with the simulated response for the 75 µm detector convolved with its RC limit. FIG. 3B is a graph showing size-dependent exponential time constants extracted from fitting each impulse response, which are shown along with the RC-limited responses and a dashed lie to guide the eye. The inset of FIG. 3B shows the fabricated metasurface-pyroelectric detectors with diameters ranging from 75 to 1,000 µm detector. FIG. 3C shows a graph of simulated thermal impulse response for the 75 µm detector. The rate of temperature change, dT/dt, is directly proportional to the generated pyroelectric voltage as described by the Equation (1).

Computationally, finite-element simulations were used to estimate the thermal-temporal limits of the detectors. For plasmonic structures, the absorbed power density can be calculated via the conductive losses from charge oscillations induced by the plasmonic mode, which depends on the local electric field, the oscillation frequency and the imaginary permittivity. In the vicinity of plasmonic nanostructures, large electric fields can produce highly localized, subwavelength absorption regions. The electromagnetic simulations were then coupled into a solid state heat transfer simulation, where the heat source is spatially defined by the absorbed power density and temporally defined by a 100 fs FWHM Gaussian pulse. The normalized temperature maps in FIGS. 2B and 2C were taken 1 ps and 40 ps after excitation. To account for any size-dependent thermal relaxation, full detectors were simulated with 75-1,000 µm diameters, which showed deviations of less than 1% in their extracted lifetimes between different detector sizes. The 75 µm thermal simulation included in FIG. 3C shows a 10-90% rise time of 41 ps and a bi-exponential decay with a primary and secondary relaxation of 580 ps and 4.91 ns, respectively. To overlay the simulated and experimental results, the simulated photoresponse was calculated according to Equation (1), which relates the rate of temperature change (FIG. 3C), the detector area (0.0044 mm$^2$), the termination resistance (51.8 Ω) and the pyroelectric coefficient. The pyroelectric coefficient for AlN was extracted by fitting the magnitude of the simulation to the experimental results, which was found to be 1.9 µC m−2 K−1 as compared to the directly measured 6-8 µC m−2 K−1 in a previous work. The discrepancy between these values probably arises from transient absorption effects during excitation by the femtosecond laser pulses, which are unaccounted for by the thermal simulations. For better visual comparison between the simulated and measured impulse responses, the simulated response was convolved with a 500 MHz Gaussian pulse corresponding to the experimental instrument-limited response time. mThe simulated and experimental impulse responses for the 75 µm detector (FIG. 3A) show precise temporal agreement for both the AlN depolarization and repolarization on heating and cooling following the femtosecond pulse. This agreement between the experimental and simulated results demonstrates the possibility of realizing much faster metasurface-pyroelectric detectors potentially with thermally limited 25 ps response times.

After demonstration of the picosecond-scale temporal dynamics, the detector responsivity was further characterized. Results from two different readout schemes for the pyroelectric detectors are shown in FIG. 4A, where the low-impedance readout scheme allows for photocurrent measurements and the high-impedance readout for measuring photovoltage. FIG. 4A is a graph showing photovoltage and photocurrent responsivities of a detector fabricated with 100 nm nanocubes. FIG. 4B is a graph showing the angle-dependent responsivity of the same detector showing large responsivities out to 60° angles. Both readout schemes possess a spectral profile matching the 100 nm nanocube metasurface shown in FIG. 2D. The angle dependence of the same detector is depicted in FIG. 4B and it is shown that the responsivity only decreases by 7% out to 60° angles, which closely follows the metasurface angular absorption profile shown previously. The power dependence was then measured to characterize the noise and sensitivity of this detector. The noise floor of the 7.0 mm$^2$ detector is depicted in FIG. 4A and shows a signal-to-noise ratio of 1 for a laser power of 1.7 µW, corresponding to an irradiance of 24 µW cm$^{-2}$. In pyroelectric/thermal detection there are multiple noise sources that determine the sensitivity of the detector, such as Johnson noise, thermal noise, 1/frequency noise and amplifier noise. In this work, Johnson noise dominates as it depends on the resistance of the detector and its temperature, which can be large for the room temperature pyroelectric films. The 675 kΩ resistance of the 7.0 mm² detector was extracted from a current-voltage curve. The theoretical Johnson noise for this detector with a high impedance amplifier was 106 nV Hz$^{-1/2}$ as shown in FIG. 5B, which closely matches the mean measured noise spectral density (NSD) of 132 nV Hz$^{-1/2}$. The low-impedance amplifier noise measurements showed better agreement between the calculated Johnson noise at 156 fA Hz$^{-1/2}$ and the mean NSD of 162 fA Hz$^{-1/2}$. The noise equivalent power (NEP) is calculated by dividing the NSD by the spectral responsivity. As expected, the highest NEP of 679 nW Hz$^{-1/2}$ occurs at the highest responsivity equating to the peak metasurface absorptance as seen in FIG. 5C and can be improved by cooling the detector to decrease the Johnson noise. The specific detectivity (D*) normalizes the performance to the detector size and is calculated by dividing the area of the detector by the NEP. As such, this metasurface-pyroelectric detector shows a peak detectivity of 3.9 Å~105 Jones, which can be improved using back thinned, thermally isolated pixels, cooling the detectors or vacuum packaging of the detector.

FIG. 5A is a graph showing power dependence of a detector with 100 nm cubes showing the noise floor for powers below 1 µW and a nearly linear photovoltage for increasing powers. FIG. 5B is a graph showing NSD for both current and voltage measurements of the same detector. FIG. 5C is a graph showing NEP calculated from the NSD showing microwatt sensitivity similar to the power-dependence noise floor plotted along with the specific detectivity (D*).

In embodiments, room-temperature ultrafast thermal photodetectors are provided by integrating a metasurface with a nanometer-scale pyroelectric film enabling an instrument-limited 700 ps rise time, a 1.67 ns FWHM and a 300 MHz bandwidth, which is almost six orders of magnitude faster than previously demonstrated spectrally selective thermal detectors. Thermal transport simulations closely match the experimental results and show the potential for response times down to 25 ps for smaller detectors approaching that of semiconductor photodiodes with carrier limited responses of ~30 ps. On chip spectral filters created by the integrated metasurfaces were used to realize spectrally selective detection from 660 to 2,000 nm. The wavelength range may be further extended into the ultraviolet-visible region through substitution of Au with Pt, Ag or Al, and into the mid-infrared by fabricating larger nanoparticles via EBL or inexpensive, large-area techniques such as deep-ultraviolet lithography or the synthesis of larger colloidal nanoparticles. These large-area devices show the potential for realizing uncooled, thermal photodetectors with high responsivities and gigahertz speeds without the spectral limitations of bandgap-based detectors. Furthermore, integrating these metasurface pyroelectric photodetectors with multiscale patterning techniques could enable on-chip hyperspectral focal plane arrays, where integration of dynamically tunable metasurfaces could allow for spectral reconstruction with a single photodetector. Fabrication. Pyroelectric AlN was deposited onto 0.2-mm-thick, <111> p-type Si wafers. Substrates were heated in an ultrahigh vacuum sputtering system (base pressure 10-9 Torr) to 800° C., and a 5 N Al target was radio frequency (RF) sputtered in an Ar/N2 atmosphere. This resulted in a polycrystalline c-axisorientated AlN film with a single nanometre-scale surface roughness as previously described. Subsequently, the colloidal film-coupled metasurfaces were deposited onto the AlN films through physical vapour deposition, layer-by-layer polymer deposition and finally the self-assembly of colloidally synthesized nanoparticles. In more detail, a 75 nm gold film with a 5 nm Ti adhesion layer was evaporated with an electron beam through a shadow mask onto the AlN surface. The shadow mask was used to simultaneously define the readout area of the detector as well as the metasurface area. Subsequently, a 7 nm spacer layer was deposited using layer-by-layer dipcoating of five alternating polyelectrolyte layers composed of a positively charged poly(allylamine) hydrochloride polymer and a negatively charged polystyrene sulfonate polymer suspended in 1 M NaCl solution. Finally, the substrate was incubated in a solution of Ag nanocubes, where the nanocube stabilizer coating was ~3 nm of poly-vinylpyrrolidone, a negatively charged polymer, which facilitates the nanocubes to electrostatically adhere to the positively charged polyelectrolyte layer. The Ag nanocubes were colloidally synthesized following a well-established process (NanoComposix Inc.). The high-speed metasurface-pyroelectric detectors shown in FIG. 3B were fabricated following the same procedure but without the shadow mask to pattern the Ti/Au films. After the deposition of the Ag nanocubes, a positive photoresist was spin-coated on top of the vertical detector stack and was patterned to be used as the etch mask. A noble metal etchant (Microchem GE8110) was used to etch through the Ag nanocubes and Au films. Afterwards, the AlN was etched using a Cl2/BCl3/Ar RIE etch recipe to expose the Si substrate and isolate neighboring detectors. The photoresist was removed with acetone and 1165 resist remover resulting in the final samples.

Some EBL metasurface-pyroelectric detectors disclosed herein were fabricated by depositing a 75 nm gold film with a 5 nm Ti adhesion layer onto an AlN film with electron-beam evaporation. The detector areas were created by patterning a positive photoresist into 85 Å~85 µm² squares and wet etching through the Au with GE8110 and the Ti with 10:1 buffered hydrofluoric acid. Afterwards, the AlN was etched using a Cl2/BCl3/Ar reactive-ion etching (RIE) recipe to expose the Si substrate and isolate neighbouring detectors. A 250 nm SiO$_2$ film was deposited over the whole sample with plasma-enhanced chemical vapour deposition. A negative photoresist was deposited and exposed to create 75 Å~75 µm² wells in the resist, which were spatially aligned to the 85 Å~85 µm2 Au/AlN pads. The exposed SiO2 films in the wells were etched down to the Au with a CHF3/Ar RIE etch and a 10:1 buffered hydrofluoric acid clean. This created 75 Å~75 µm² wells with exposed Au films and SiO$_2$ everywhere else on the sample. The SiO$_2$ film prevented the traces from shorting to the conductive Si wafer. A negative photoresist was used to pattern the Au traces to the outside of the wafer, which consisted of a 5 nm Ti and 200 nm Au film. Subsequently, a 7 nm Al2O3 film was deposited with atomic layer deposition (ALD) on the entire sample except for the contact pads and the thickness was measured with ellipsometry. For the nanoparticle deposition via EBL, poly(methylmethacrylate) (PMMA) was spin-coated on the wafer and exposed with an Elionix ELS-7500 EX E-Beam Lithography System with a 2.1 µs dose at 50 pA and 50 kV. The exposed PMMA was developed and a 30 nm Au film was evaporated on the pattern. The PMMA and Au was lifted off leaving only the nanoparticles patterned on the sample. Lastly, the sample was conductive epoxied to a wafer carrier and the top traces were wire-bonded to the leads, which were connected to a female coaxial connector for readout.

For absorption measurements, the reflection spectra from 400 to 1,550 nm of the metasurface and Au detectors where measured with a custom-built microscope integrated with a visible and near-infrared spectrometer. A 50/50 beamsplitter was used to couple a broadband white light source into the microscope and spectrometer. The spectra were averaged over an area with a 60 µm diameter using a 0.15 numerical aperture objective and were normalized relative to the reflectance of an Ag mirror. The reflection spectra from 1,550 to 3,000 nm were measured on a Bruker Hyperion microscope integrated with a Vertex 80 v spectrometer with a Å~15 objective and were normalized relative to an Au reference.

For impulse response measurements, the impulse response of the metasurface pyroelectric detectors was measured with a ~100 fs laser pulse generated by a Coherent Libra with a 1 kHz repetition rate at a wavelength of 800 nm. The femtosecond laser pulse can be approximated as an impulse, since the relevant dynamics of the metasurface-pyroelectric detectors were on the pico- to nanosecond time scales. The laser was attenuated through a variable neutral density (ND) filter to reduce the 3.2 W output power to 0.5-2.0 mW at the detector. The beam was aligned into a custom-built microscope to focus the incident laser onto the various detector sizes. Electrically, a micromanipulator with a tungsten tip was used to contact the Au film and was connected to the core conductor of a coaxial cable. The shielding of the coaxial cable was bonded to the bulk p-type Si substrate, where the pyroelectric voltage was measured between the centre conductor and the shielding of the coaxial cable. The impulse response of the detectors was captured on a 1 GHz oscilloscope triggered by the external trigger of the Coherent Libra.

For responsivity measurements, a broadband SuperK supercontinuum laser with an acousto-optic tunable filter was used as a tunable monochromatic source with linewidths between 1.8 and 5.0 nm for 640-1,100 nm wavelengths and linewidths between 6.4 and 20.0 nm for the 1,200-2,000 nm wavelengths. As such, the responsivity was sampled at 5 nm intervals between 640 and 1,100 nm and 25-50 nm intervals in the 1,200 1,600 nm range to reduce the correlation between data points. Following the acousto-optic tunable filter, the laser was sent through a variable ND filter, a rotating chopper wheel and an iris, which determines the diameter of the beam. A computer-controllable flip mirror directed the laser after these optical elements to a power meter. The power meter and variable ND filter were used either for power stabilization or for the power-dependence measurements. The chopper wheel was driven with a stabilized frequency reference from a lock-in amplifier at 137 Hz. The chopped/modulated laser when absorbed by the detector produced a modulated pyroelectric voltage, enabling the lock-in amplifier to conduct phase-sensitive detection at the modulation frequency used for low-noise, high-sensitivity measurements. Before the lock-in amplifier, the signal was input into a high- or low impedance amplifier for measuring either the photovoltage or photocurrent, respectively. The measured pyroelectric response was recorded via a Labview program for each wavelength or power step, and was divided by the laser power to get the responsivity. The NSD was provided by the lock-in amplifier to assess the noise performance of the detector.

Transient thermal simulations were conducted in COMSOL Multiphysics utilizing the Wave Optics module for the absorptive characteristics and the Heat Transfer module for the separate thermal simulations. The electromagnetic (EM) simulation was conducted in the frequency domain with the boundary conditions laid out in FIG. 6. The results from the EM simulations were fed into a solid-state heat transfer simulation with the boundary conditions in FIG. 6. The x-y boundary in air was held at a constant temperature to prevent reflections of the thermal impulse from the air. The x-y boundary in the Si substrate allowed $2.6*10^7$ W/m2K of constant heat flux arising from the thermal conductivity of Si (130 W/mK) and assuming the surface of constant temperature lies 5 µm below the simulated boundary. The heat flux boundary condition allowed for faster simulations and did not change the thermal relaxation dynamics when compared to simulations with thick Si substrates up to 10 µm.

The absorptive characteristics of the detectors were simulated with the Wave Optics module to calculate the absorbed power density at the fundamental plasmon resonance. The absorbed power density ($Q_h$) shown in FIG. 7B was calculated as the conductive losses from charge oscillations induced by the plasmonic mode, which is dependent upon the local electric field ($\vec{E}$), the frequency of oscillation ($\omega$), and the imaginary component of the permittivity ($\varepsilon''$):

$$Q_h = 1/2\omega\varepsilon''(\omega)|\vec{E}(\omega)|^2$$

The electric field map is highly-localized in the gap region between the Ag cube and the Au film as shown in FIG. 7A and is utilized for the absorbed power density calculation shown in FIG. 7B. The absorption spectra shown in FIG. 7C is overlaid with the absorption amount occurring in each.

FIG. 6 illustrates a schematic of a single metasurface element used for both the electromagnetic and heat transfer simulations and their associated boundary conditions. of the metasurface constituents. The constituent absorptions were calculated by integrating the absorbed power density over the volume of the specific material. The structure was designed to localize the absorption in the Au film for faster thermal diffusion. Temporally, the plasmon is expected to produce a measurable thermal signature impulse that is delayed by 200 fs after the initial excitation, which is consistent with previous investigations showing a mean plasmon decay and e-e scattering time of 185 fs. For the transient thermal simulations, a 100 fs Gaussian thermal pulse delayed by 200 fs was utilized for the temporal excitation and the absorbed power density for the spatial excitation, where the pulse power was modeled after actual experiments with a 100-fs laser excitation, 3 W/cm$^2$ averaged irradiance, and a 1 kHz repetition rate.

The full detector thermal simulations were similarly computed using the COMSOL Multiphysics package with the Heat Transfer module. A simplified model was essential to simulate the full detectors as a 75 µm detector covered in 100 nm nanocubes could contain up to 90,000 metasurface elements, which is not feasible to simulate individually. Thus, the thermal generation from the metasurface elements is assumed to be spatially uniform on the surface of the Au film. The simulated detectors with diameters ranging between 75-1000 µm consisted of a vertical stack of a 10 µm thick air buffer, a 75 nm Au film, a 105 nm AlN active layer, and a 20 µm thick Si substrate, where the thermal excitation was carried out through a boundary heat source on top of the 75 nm Au film. The same Gaussian 100 fs pulse was utilized for excitation and the transient dynamics were captured for the AlN film. A 2D simulation using radial symmetry was conducted since the detectors were circular, where all boundaries other than the axial symmetry were placed at a constant temperature of 293.15 K. Lateral diffusion for the macroscopic detectors larger than 25 µm diameters had a negligible effect on the thermal relaxation. These macroscopic simulations show close agreement with the thermal simulations of the single metasurface element despite ignoring the absorption and thermal diffusion from the Ag nanocubes.

FIG. 7A illustrates an electric-field profile of a plasmonic metasurface element at the fundamental plasmon resonance. FIG. 7B illustrates absorbed power density of nanostructure exposed with an irradiance of 3 W/cm$^2$, showing the majority of absorption occurs in the Au. FIG. 7C is a graph of simulated spectral absorption showing 96 percent absorption at the fundamental resonance around 780 nm. Dashed lines show absorption percentages from specific constituents of the plasmonic metasurface. FIG. 7D illustrates a graph showing simulated temperature change of AlN film after excitation with a fs-pulse shown for two different simulations.

The DC electrical characteristics of the metasurface-pyroelectric devices were found through assessment of the I-V curves shown in FIG. 8A, where the I-V curve of the largest 7.0 mm2 detector is shown. This result shows I-V behavior analogous to a diode response arising from the Schottky diode forming between the AlN and Ti adhesion layer. The p-type Si substrate and the p-type AlN will prevent the formation of a p-n junction. The inset shows an enlarged plot of the origin, where the I-V curve shows nearly resistive behavior for low voltages. Fitting the slope of the I-V curve in this regime provides a resistance of 675 kΩ, which is utilized in the main text to estimate the noise floor of the detectors.

Next, the RC characteristics of the smaller diameter detectors, 75-1000 μm, were measured with a LCR meter using a 1 MHz carrier frequency. The measured capacitances from the LCR meter are overlaid in FIG. 8B with the corresponding parallel plate capacitances for each detector calculated from their areas. The impulse responses were measured on a Keysight InfiniiVision oscilloscope with a 1 GHz bandwidth and an 8 pF input capacitance. The effective capacitance of the micromanipulator, SMA, and contact was found to be 180 pF by fitting the extracted exponential time constants to that of the RC time constant of the entire electrical circuit. The resistance of the oscilloscope termination, contact resistance, tungsten probe, and SMA cable was measured to be 51.8 Ω. This resistance multiplied by the measured capacitances gave the RC time constants in the main text.

Particularly, FIG. 8A is a graph showing the Schottky diode response arising from the contact between the pyroelectric AlN and the Ti adhesion layer. The inset shows a linear I-V response for the area of device operation along with the linear fit showing a 675 kΩ resistance at low voltages. FIG. 8B is a graph showing the size-dependent capacitance of the metasurface-pyroelectric detectors showing a near-ideal parallel plate capacitance for smaller detector sizes.

The EBL metasurface-pyroelectric detectors were fabricated to demonstrate the potential of pyroelectrics to exhibit resonances and photovoltages over a broad wavelength range which is beyond the sensitivity of InGaAs and Si in this work. Images of the EBL metasurface-pyroelectric detector is shown in FIGS. 9A-9D. The 85×85 μm Au/AlN pads with their internal 75×75 μm active region can be clearly seen in FIG. 9A along with the trace leading to the edge of the wafer at the top of the image. The metasurface deposited on the detector can be clearly seen in the SEM images of FIGS. 9B and 9C. The average lateral particle size is 269±1 nm and possesses a 29.3% fill-fraction, where a cross-section of the metasurface elements are shown in FIG. 9D.

FIG. 9A shows a microscope image of the 85×85 μm detector with a 75×75 μm active area. FIG. 9B shows an SEM image of the detector showing the EBL fabricated nanoparticle array. FIG. 9C shows an SEM image showing 270 nm Au nanoparticles fabricated on the detector. FIG. 9D illustrates a cross-section of a single metasurface element in the center of the detector.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A pyroelectric detector comprising:
   a plurality of pixels being spaced apart for receiving different portions of light, wherein each pixel comprises:
   an artificial optical absorber or plasmonic absorber comprising an ensemble of subwavelength conductive components that are substantially cuboid in shape for forming a plasmonic structure, wherein the subwavelength conductive components generate thermal energy only in response to receipt of light having a predetermined wavelength range; and
   a pyroelectric material positioned to receive the generated thermal energy, and wherein the pyroelectric material generates an electrical signal representative of the received thermal energy; and
   an electronic component configured to receive the electrical signal from the pyroelectric material of each pixel for detection of the received light.

2. The pyroelectric detector of claim 1, wherein the subwavelength conductive components generate thermal energy in response to receipt of light of different wavelengths within the predetermined wavelength range.

3. The pyroelectric detector of claim 1, wherein the plasmonic structures of each pixel includes one of silver, palladium, platinum, aluminum, rhodium, gold, titanium nitride, semiconductors, doped zinc oxide semiconductor, and doped indium tin oxide semiconductor.

4. The pyroelectric detector of claim 1, wherein the the subwavelength conductive components are smaller than the wavelength of light.

5. The pyroelectric detector of claim 1, wherein the the subwavelength conductive components comprise a plurality of nanoparticles that are one of spherical, cylindrical, or polyhedra in shape.

6. The pyroelectric detector of claim 1, wherein the the subwavelength conductive components comprise a plurality of nanoparticles having a size range between about 30-2000 nm.

7. The pyroelectric detector of claim 1, wherein each pixel further comprises a conductive layer with the subwavelength conductive components of the respective pixel being attached thereto for receipt of the generated thermal energy therefrom.

8. The pyroelectric detector of claim 7, wherein the subwavelength conductive components are dispersed on or in the conductive layer.

9. The pyroelectric detector of claim 7, wherein the conductive layer of each pixel is made of plasmonic materials for predetermined wavelengths.

10. The pyroelectric detector of claim 7, wherein the conductive layer of each pixel is a contact for the electronic component for output of the electrical signal to the electronic component.

11. The pyroelectric detector of claim 1, wherein the pyroelectric material is made of a poly-crystalline or crystalline film.

12. The pyroelectric detector of claim 1, wherein the pyroelectric material of each pixel is comprised of materials including aluminum nitride, zinc oxide, lithium niobite, or lithium tantalite or any other pyroelectric material.

13. The pyroelectric detector of claim 12, wherein the pyroelectric material is layered and has a thickness between about 10-1000 nm.

14. The pyroelectric detector of claim 1, further comprising a plurality of contacts each operatively connected to the pyroelectric material of a respective pixel and the electronic component for communicating the generated electrical signals to the electronic component.

15. The pyroelectric detector of claim 1, wherein the electronic component is configured to condition the electrical signal for processing, and further comprising an image capture device configured to receive the conditioned electrical signal for generating one or more images representative of the light received by the subwavelength conductive components.

16. A pyroelectric detector comprising:
a first contact layer;
a second contact layer;
a plurality of pixels being spaced apart for receiving different portions of light, wherein each pixel comprises:
a layer of pyroelectric material having a first and a second side, the first side being attached to the first contact layer, and the second side being attached to the second contact layer;
a plasmonic structure attached to the second side of the layer of pyroelectric material or encompassing the pyroelectric material, wherein the plasmonic structure comprises an ensemble of subwavelength conductive components that are substantially cuboid in shape, wherein the subwavelength conductive components is receives light and generates thermal energy from the received light of the predetermined wavelength for receipt of the generated thermal energy only in response to receipt of light having a predetermined wavelength range such that an electrical signal across its respective portion of the first and its respective portion of the second contact is generated that represents the received thermal energy.

17. The pyroelectric detector of claim 16, wherein the subwavelength conductive components generate thermal energy in response to receipt of light of different wavelengths within the predetermined wavelength range.

18. The pyroelectric detector of claim 16, wherein the plasmonic structures of each pixel includes one of silver, palladium, platinum, aluminum, rhodium, gold, titanium nitride, semiconductors, doped zinc oxide semiconductor, and doped indium tin oxide semiconductor.

19. The pyroelectric detector of claim 16, wherein the subwavelength conductive components comprise a plurality of nanoparticles having a size range between about 30-2000 nm.

20. The pyroelectric detector of claim 16, wherein the layer of pyroelectric material is made of a poly-crystalline or crystalline film.

* * * * *

UNITED STATES PATENT AND TRADEMARK OFFICE
CERTIFICATE OF CORRECTION

| | |
|---|---|
| PATENT NO. | : 11,630,000 B2 |
| APPLICATION NO. | : 16/894692 |
| DATED | : April 18, 2023 |
| INVENTOR(S) | : Maiken Mikkelsen and Jon Stewart |

It is certified that error appears in the above-identified patent and that said Letters Patent is hereby corrected as shown below:

In the Claims

At Claim 16, Column 20, Line 7, please replace with:
-- ponents receives light and generates thermal --

Signed and Sealed this
Nineteenth Day of September, 2023

Katherine Kelly Vidal
*Director of the United States Patent and Trademark Office*